(12) United States Patent
Kunihiro et al.

(10) Patent No.: US 9,540,039 B2
(45) Date of Patent: Jan. 10, 2017

(54) VEHICLE STEERING CONTROL DEVICE

(75) Inventors: Yoji Kunihiro, Susono (JP); Takahiro Kojo, Gotenba (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 57 days.

(21) Appl. No.: 14/413,542

(22) PCT Filed: Jul. 9, 2012

(86) PCT No.: PCT/JP2012/067476
§ 371 (c)(1),
(2), (4) Date: Jan. 8, 2015

(87) PCT Pub. No.: WO2014/010015
PCT Pub. Date: Jan. 16, 2014

(65) Prior Publication Data
US 2015/0307125 A1    Oct. 29, 2015

(51) Int. Cl.
*A01B 69/00*     (2006.01)
*B62D 6/00*     (2006.01)
(Continued)

(52) U.S. Cl.
CPC ............. *B62D 6/003* (2013.01); *B62D 5/008* (2013.01); *B62D 6/02* (2013.01); *B62D 6/04* (2013.01); *B62D 7/159* (2013.01)

(58) Field of Classification Search
CPC ......... B62D 5/008; B62D 6/003; B62D 7/159; B62D 6/02; B62D 6/04; B62D 6/00; B62D 5/04; B62D 101/00; B62D 111/00; B62D 113/00; B62D 117/00; B62D 137/00
(Continued)

(56) References Cited

U.S. PATENT DOCUMENTS

| | | | |
|---|---|---|---|
| 7,885,742 B2 * | 2/2011 | Yamazaki | B62D 6/001 180/410 |
| 2002/0007236 A1 * | 1/2002 | Sadano | B62D 1/28 701/28 |

(Continued)

FOREIGN PATENT DOCUMENTS

| | | |
|---|---|---|
| DE | 198 13 945 A1 | 9/1999 |
| JP | 2004 306717 | 11/2004 |

(Continued)

OTHER PUBLICATIONS

International Search Report Issued Sep. 25, 2012 in PCT/JP12/067476 Filed Jul. 9, 2012.

*Primary Examiner* — Jaime Figueroa
(74) *Attorney, Agent, or Firm* — Oblon, McClelland, Maier & Neustadt, L.L.P.

(57) ABSTRACT

A vehicle steering control device includes a turning angle varying device serving as a first turn response change device for changing a gain of yaw rate of a vehicle with respect to steering operation, and a rear wheel steering device serving as a second turn response change device for changing a gain of lateral acceleration of the vehicle with respect to the steering operation. Under a state in which magnitude of curvature of a travel path is equal to or less than a first reference value, at least one of the turning angle varying and rear wheel steering devices is controlled so that a ratio of the gain of the lateral acceleration to the gain of the yaw rate increases when a width of the travel path is small compared with when the width of the travel path is large.

14 Claims, 14 Drawing Sheets

(51) Int. Cl.
    *B62D 11/00*     (2006.01)
    *B62D 12/00*     (2006.01)
    *B63G 8/20*     (2006.01)
    *B63H 25/04*     (2006.01)
    *G05D 1/00*     (2006.01)
    *G06F 7/00*     (2006.01)
    *G06F 17/00*     (2006.01)
    *G06F 19/00*     (2011.01)
    *B62D 5/00*     (2006.01)
    *B62D 7/15*     (2006.01)
    *B62D 6/02*     (2006.01)
    *B62D 6/04*     (2006.01)

(58) Field of Classification Search
    USPC .......................................................... 701/42
    See application file for complete search history.

(56) References Cited

U.S. PATENT DOCUMENTS

| | | | | |
|---|---|---|---|---|
| 2005/0216156 | A1* | 9/2005 | Asano | G05D 1/0891 701/41 |
| 2005/0267666 | A1* | 12/2005 | Suzumura | B60T 8/1755 701/70 |
| 2006/0149445 | A1* | 7/2006 | Suzumura | B60T 8/1755 701/41 |
| 2008/0243339 | A1* | 10/2008 | Nishimori | B60G 7/003 701/41 |
| 2010/0211235 | A1* | 8/2010 | Taguchi | B60T 7/22 701/1 |
| 2010/0250068 | A1* | 9/2010 | Yamazaki | B62D 6/001 701/41 |
| 2011/0137488 | A1* | 6/2011 | Sakugawa | B60W 30/12 701/1 |
| 2012/0109464 | A1* | 5/2012 | Mizutani | B60W 10/184 701/42 |
| 2012/0303218 | A1* | 11/2012 | Tamura | B62D 1/02 701/41 |
| 2015/0158526 | A1* | 6/2015 | You | B62D 1/28 701/42 |
| 2015/0266504 | A1* | 9/2015 | Kunihiro | B62D 5/0463 701/41 |
| 2015/0298691 | A1* | 10/2015 | Kodaira | B62D 15/025 701/48 |
| 2015/0307125 | A1* | 10/2015 | Kunihiro | B62D 5/008 701/42 |

FOREIGN PATENT DOCUMENTS

| | | |
|---|---|---|
| JP | 2008 44427 | 2/2008 |
| JP | 2010 188884 | 9/2010 |
| WO | WO 2011/161535 A1 | 12/2011 |

* cited by examiner

VEHICLE STEERING CONTROL DEVICE

TECHNICAL FIELD

The present invention relates to a vehicle steering control device, and mand e particularly, to a vehicle steering control device configured to change a gain of a yaw rate of a vehicle with respect to a steering operation and a gain of a lateral acceleration of the vehicle with respect to the steering operation.

BACKGROUND ART

A steering control device configured to change a steering characteristic depending on a width of a travel path is known as a steering control device for a vehicle such as a motor vehicle. For example, Patent Literature 1 filed by the applicant of this application discloses a steering control device configured to increase a steering gear ratio and increase a derivative gain of a steering transmission ratio when the travel path width is small compared with when the travel path width is large.

The steering control device disclosed in Patent Literature 1 can increase a traveling performance when the vehicle travels straight on a narrow path compared with a case where the steering gear ratio is not increased even when the travel path width is small. Moreover, the steering control device can increase a traveling performance when the vehicle travels on a narrow and greatly meandering path compared with a case where the derivative gain of the steering transmission ratio is not increased even when the travel path width is small.

CITATION LIST

Patent Literature

[PTL 1] JP 2008-44427 A

SUMMARY OF INVENTION

Problems to be Solved by the Invention

In the steering control device disclosed in Patent Literature 1, the gain of the yaw rate of the vehicle with respect to the steering operation is decreased, and the derivative gain of the yaw rate is increased when the travel path width is small compared with when the travel path width is large, resulting in the increase in the narrow path traveling performance of the vehicle. However, when the steering operation is carried out, a yaw rate is generated on the vehicle, and the vehicle turns with respect to the travel path.

Control of a position of the vehicle in a lateral direction with respect to the travel path is more effective than control of a direction of the vehicle with respect to the travel path in order to effectively increase the traveling performance when the vehicle travels straight on a narrow path. However, in the steering control device disclosed in Patent Literature 1, when the control of the position of the vehicle in the lateral direction with respect to the travel path is tried through the steering operation, the vehicle turns with respect to the travel path, and a yaw angle with respect to the travel path cannot be avoided from being generated.

Moreover, in the steering control device disclosed in Patent Literature 1, when a steering operation is carried out to control the position of the vehicle in the lateral direction with respect to the travel path, a correction steering is required to correct the direction of the vehicle with respect to the travel path. Thus, the steering control device disclosed in Patent Literature 1 has a room for improvement also in this point in terms of the increase in the narrow path traveling performance of the vehicle.

The present invention has been made in view of the above-mentioned problems of the related-art steering control device as disclosed in Patent Literature 1. Thus, a major object of the present invention is to provide a steering control device improved to further increase the narrow path traveling performance of the vehicle compared with the related-art device by facilitating the control of the position of the vehicle in the lateral direction with respect to the travel path during the narrow path travel.

Means for Solving the Problems and Effects of the Invention

In order to achieve the above-mentioned major object, according to one embodiment of the present invention, there is provided a vehicle steering control device, including: first turn response varying means for changing a gain of a yaw rate of a vehicle with respect to a steering operation; second turn response varying means for changing a gain of a lateral acceleration of the vehicle with respect to the steering operation; and control means for controlling the first turn response varying means and the second turn response varying means, the control means being configured to control, under a state in which a magnitude of a curvature of a travel path is equal to or less than a first reference value, at least one of the first turn response varying means and the second turn response varying means so that a ratio of the gain of the lateral acceleration to the gain of the yaw rate increases when a width of the travel path is small compared with when the width of the travel path is large. Moreover, there is provided a vehicle steering control device, including: third turn response varying means for changing a derivative gain of a yaw rate of a vehicle with respect to a steering operation speed; fourth turn response varying means for changing a derivative gain of a lateral acceleration of the vehicle with respect to the steering operation speed; and control means for controlling the third turn response varying means and the fourth turn response varying means, the control means being configured to control, under a state in which a magnitude of a curvature of a travel path is equal to or more than a second reference value, at least one of the third turn response varying means and the fourth turn response varying means so that a ratio of the derivative gain of the lateral acceleration to the derivative gain of the yaw rate increases when a width of the travel path is small compared with when the width of the travel path is large.

With the above-mentioned former configuration, under the state in which the magnitude of the curvature of the travel path is equal to or less than the first reference value, the ratio of the gain of the lateral acceleration to the gain of the yaw rate is controlled to increase when the width of the travel path is small compared with when the width of the travel path is large. Thus, under a state in which the vehicle travels straight on a narrow path, the position of the vehicle in the lateral direction with respect to the travel path can be effectively controlled while the generation of the yaw angle is suppressed, resulting in an effective increase in the narrow path traveling performance of the vehicle. It should be noted that, when the width of the travel path is large, the gain of the lateral acceleration with respect to the gain of the yaw rate does not increase, and thus the lane change or a course change does not become difficult.

Further, with the above-mentioned latter configuration, under the state in which the magnitude of the curvature of the travel path is equal to or more than the second reference value, the ratio of the derivative gain of the lateral acceleration to the derivative gain of the yaw rate is controlled to increase when the width of the travel path is small compared with when the width of the travel path is large. Thus, under a state in which the vehicle meanders on a narrow path, compared with a case where the gain of the yaw rate and the gain of the lateral acceleration are greatly changed, a fear of a change in a turn curvature of the vehicle can be decreased. Moreover, the generation of the yaw angle of the vehicle can be suppressed, and a correction of the lateral displacement of the vehicle can be facilitated. Therefore, a correction steering caused by the generation of the yaw angle when the vehicle meanders can thus be decreased.

Moreover, under the state in which the magnitude of the curvature of the travel path is equal to or more than the second reference value, even when the width of the travel path is small, the ratio of the gain of the lateral acceleration with respect to the gain of the yaw rate is not increased or decreased based on the width of the travel path. Thus, under the state in which the vehicle travels while turning or meandering along a narrow path, the turn radius of the vehicle can be prevented from being changed by the changes in the gain of the yaw rate and the gain of the lateral acceleration of the vehicle with respect to the steering operation.

Further, according to one embodiment of the present invention, in the above-mentioned configurations, the control means may control, under a state in which the width of the travel path changes to decrease, at least one of the first turn response varying means and the second turn response varying means, or at least one of the third turn response varying means and the fourth turn response varying means based on a width of a travel path for control, which is corrected so that the width changes earlier and more gently than the width of the actual travel path.

In general, the demand for operability required for the vehicle to travel along the travel path becomes stricter as the width of the travel path decreases. The above-mentioned configuration can change early and gently the ratio of the gain of the lateral acceleration to the gain of the yaw rate and the ratio of the derivative gain of the lateral acceleration to the derivative gain of the yaw rate under the state in which the width of the travel path changes to decrease. Thus, it is possible to decrease a sense of discomfort caused by a rapid change in a turn response of the vehicle when the width of the travel path changes to decrease. Moreover, the driver can get used to the operability of the vehicle suitable to the travel on the narrow path before the width of the travel path actually decreases. Thus, the narrow path traveling performance of the vehicle can be increased while such a fear that the driver feels the sense of discomfort is decreased.

Further, according to one embodiment of the present invention, in the above-mentioned configurations, the control means may control, under a state in which the curvature of the travel path changes to increase, at least one of the first turn response varying means and the second turn response varying means, or at least one of the third turn response varying means and the fourth turn response varying means based on a curvature of a travel path for control, which is corrected so that the curvature changes earlier and more gently than the curvature of the actual travel path.

In general, the demand for operability required for the vehicle to travel along the travel path becomes stricter as the curvature of the travel path increases. The above-mentioned configuration can change early and gently the ratio of the gain of the lateral acceleration to the gain of the yaw rate and the ratio of the derivative gain of the lateral acceleration to the derivative gain of the yaw rate under the state in which the curvature of the travel path changes to increase. Thus, it is possible to decrease a sense of discomfort caused by a rapid change in a turn response of the vehicle when the curvature of the travel path changes to increase. Moreover, the driver can get used to the operability of the vehicle suitable to the travel on the travel path with a large curvature before the curvature of the travel path actually increases. Thus, the narrow path traveling performance of the vehicle on the travel path with a large curvature can be increased while such a fear that the driver feels the sense of discomfort is decreased.

Further, according to one embodiment of the present invention, in the above-mentioned configuration, the control means may acquire information on a yaw angle of the vehicle, and control at least one of the first turn response varying means and the second turn response varying means so that a change in at least one of the gain of the yaw rate and the gain of the lateral acceleration caused by a change in the width of the travel path becomes gentler when a magnitude of the yaw angle of the vehicle is large compared with when the magnitude of the yaw angle of the vehicle is small.

The above-mentioned configuration can gently change the turn response of the vehicle caused by the change in at least one of the gain of the yaw rate and the gain of the lateral acceleration when the magnitude of the yaw angle of the vehicle is large compared with when the magnitude of the yaw angle of the vehicle is small. Thus, the turn response of the vehicle under the state in which the magnitude of the yaw angle of the vehicle is small can be quickly changed in response to the change in the width of the travel path while the sense of the discomfort caused by the rapid change in the turn response of the vehicle under the state in which the magnitude of the yaw angle of the vehicle is large is decreased.

Further, according to one embodiment of the present invention, in the above-mentioned configuration, the control means may acquire information on a yaw angle of the vehicle, and control at least one of the third turn response varying means and the fourth turn response varying means so that a change in at least one of the derivative gain of the yaw rate and the derivative gain of the lateral acceleration caused by a change in the width of the travel path becomes gentler when a magnitude of the yaw angle of the vehicle is large compared with when the magnitude of the yaw angle of the vehicle is small.

The above-mentioned configuration can gently change the turn response of the vehicle caused by the change in at least one of the derivative gain of the yaw rate and the derivative gain of the lateral acceleration when the magnitude of the yaw angle of the vehicle is large compared with when the magnitude of the yaw angle of the vehicle is small. Thus, the turn response of the vehicle under the state in which the magnitude of the yaw angle of the vehicle is small can be quickly changed in response to the change in the width of the travel path while the sense of the discomfort caused by the rapid change in the turn response of the vehicle under the state in which the magnitude of the yaw angle of the vehicle is large is decreased.

Moreover, according to one embodiment of the present invention, in the above-mentioned configurations, the first turn response varying means and the third turn response varying means may change a relationship of a steered angle of a front wheel with respect to a steering operation amount.

The above-mentioned configuration can change the gain of the yaw rate of the vehicle with respect to the steering operation and the derivative gain of the yaw rate of the vehicle with respect to the steering operation through the change in the relationship of the steered angle of the front wheel with respect to the steering operation amount.

Moreover, according to one embodiment of the present invention, in the above-mentioned configurations, the first turn response varying means and the third turn response varying means may change a steering characteristic of the vehicle.

The above-mentioned configuration can change the gain of the yaw rate of the vehicle with respect to the steering operation and the derivative gain of the yaw rate of the vehicle with respect to the steering operation through the change in the steering characteristic of the vehicle.

Moreover, according to one embodiment of the present invention, in the above-mentioned configurations, the second turn response varying means and the fourth turn response varying means may change a relationship of a steered angle of a rear wheel with respect to a steered angle of a front wheel.

The above-mentioned configuration can change the gain of the lateral acceleration of the vehicle with respect to the steering operation and the derivative gain of the lateral acceleration of the vehicle with respect to the steering operation through the change in the relationship of the steered angle of the rear wheel with respect to the steered angle of the front wheel.

Preferred Aspects of Means to Solve the Problems

According to a preferred aspect of the present invention, the vehicle may include an imaging device for imaging at least a front view of the vehicle, and the control means may estimate at least one of the curvature and the width of the identified travel path based on imaged information supplied from the imaging device.

According to another preferred aspect of the present invention, the vehicle may include a navigation device, and the control means may estimate at least one of the curvature and the width of the travel path based on map information supplied from the navigation device.

According to another preferred aspect of the present invention, the control means may estimate at least one of the curvature and the width of the travel path based on information on the travel path wirelessly supplied from a communication base station outside the vehicle.

According to another preferred aspect of the present invention, under the state in which the width of the travel path changes to decrease, the control means may control at least one of the first turn response varying means and the second turn response varying means based on a width of a travel path for control, which is corrected so that the width changes earlier and more gently than the width of the actual travel path, and a completion of the change in the width is earlier than the width of the actual travel path.

According to another preferred aspect of the present invention, the control means may control, under a state in which the width of the travel path changes to increase, at least one of the first turn response varying means and the second turn response varying means based on a width of a travel path for control, which is corrected so that the width changes more gently than the width of the actual travel path.

According to another preferred aspect of the present invention, the control means may control, under a state in which the curvature of the travel path changes to decrease, at least one of the first turn response varying means and the second turn response varying means based on a curvature of a travel path for control, which is corrected so that the curvature changes more gently than the curvature of the actual travel path.

According to another preferred aspect of the present invention, when the magnitude of the yaw angle of the vehicle is equal to or more than a reference valve of the yaw angle, the control means may control at least one of the first turn response varying means and the second turn response varying means so as to suppress the change in at least one of the gain of the yaw rate and the gain of the lateral acceleration caused by the change in the width of the travel path.

According to another preferred aspect of the present invention, when the magnitude of the yaw angle of the vehicle is equal to or more than a reference valve of the yaw angle, the control means may control at least one of the first turn response varying means and the second turn response varying means so as to suppress the change in at least one of the derivative gain of the yaw rate and the derivative gain of the lateral acceleration caused by the change in the width of the travel path.

According to another preferred aspect of the present invention, the device for changing the steering characteristic of the vehicle may be an active stabilizer device, an active suspension, an active limited slip differential gear (LSD), or an arbitrary combination thereof.

According to another preferred aspect of the present invention, the first turn response varying means may be a device for providing a difference in a braking force or a driving force between the right and left wheels.

DESCRIPTION OF EMBODIMENTS

A detailed description is now given of some preferred embodiments of the present invention referring to the accompanying drawings.

[First Embodiment]

Figure 1:
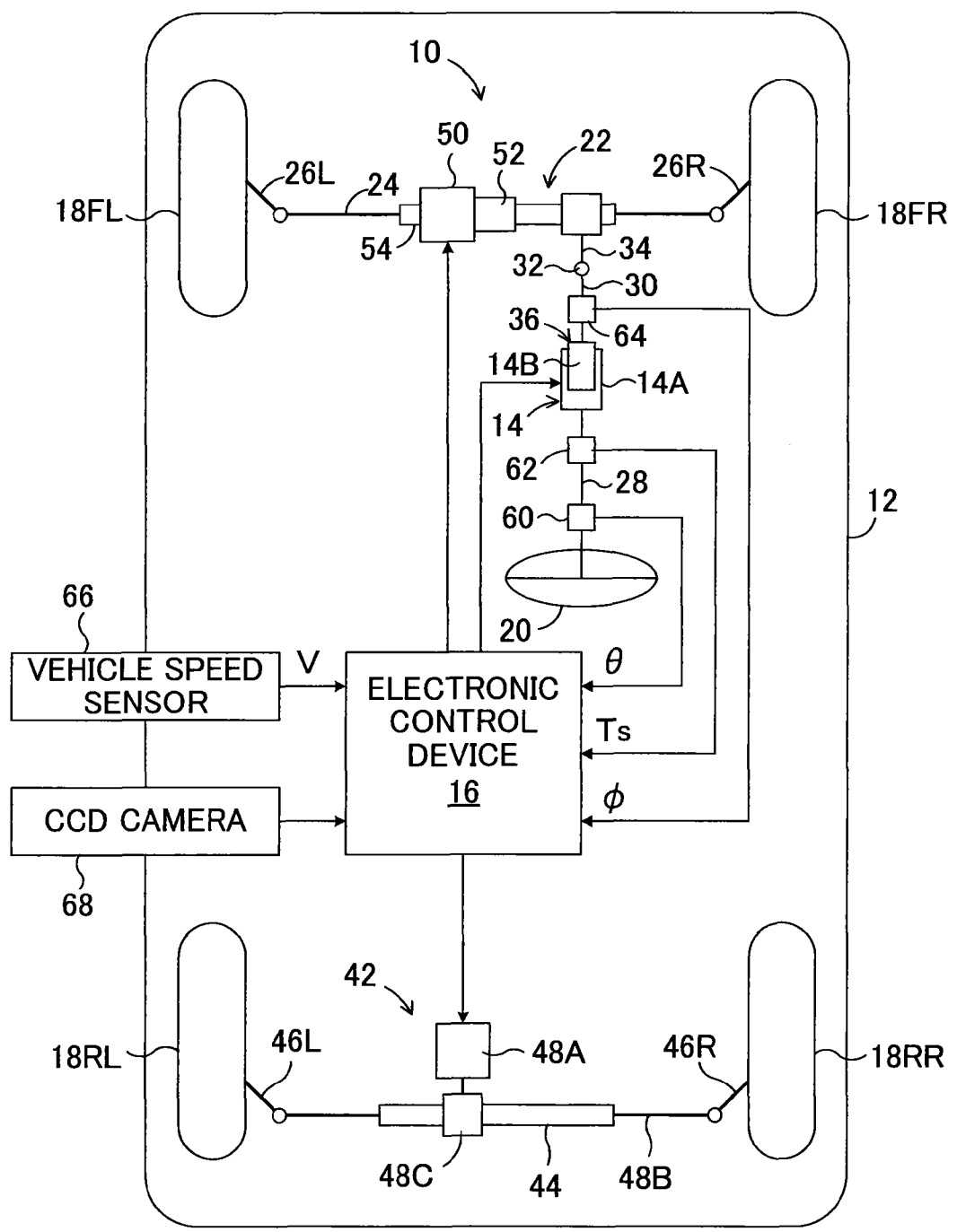
FIG. 1 is a schematic configuration diagram illustrating a vehicle steering control device according to a first embodiment of the present invention applied to a four-wheel steering vehicle.

FIG. 1 is a schematic configuration diagram illustrating a vehicle steering control device according to a first embodiment of the present invention applied to a four-wheel steering vehicle.

In FIG. 1, reference numeral 10 denotes the steering control device installed on a vehicle 12, and the steering control device 10 includes a turning angle varying device 14, and an electronic control device 16 for controlling the turning angle varying device 14. Moreover, in FIG. 1, reference numerals 18FL and 18FR respectively denote front left and right wheels of the vehicle 12, and reference numerals 18RL and 18RR respectively denote rear left and right wheels. The front left and right wheels 18FL and 18FR, which are steered wheels, are turned via a rack bar 24 and tie rods 26L and 26R by an electric power steering device 22 of the rack-and-pinion type driven in response to an operation by a driver on a steering wheel 20.

The steering wheel 20, which is steering input means, is connected for drive to a pinion shaft 34 of the power steering device 22 via an upper steering shaft 28, a turning angle varying device 14, a lower steering shaft 30, and a universal joint 32. The turning angle varying device 14 includes a motor 36 for supplementary turning drive coupled to a lower end of the upper steering shaft 28 on a housing 14A side, and coupled to an upper end of the lower steering shaft 30 via a speed reduction mechanism (not shown) on a rotator 14B side.

Thus, the turning angle varying device 14 rotationally drives the lower steering shaft 30 relatively to the upper steering shaft 28, thereby driving, for supplementary turning, the front left and right wheels 18FL and 18FR relatively to the steering wheel 20. As a result, the turning angle varying device 14 also functions as a variable gear ratio steering (VGRS) device for increasing/decreasing a steering gear ratio (reciprocal of steering transmission ratio), thus also functions as a steering transmission ratio varying device, and is controlled by a steering angle control part of the electronic control device 16.

The rear left and right wheels 18RL and 18RR are steered via tie rods 46L and 46R by an electric drive device 44 of a rear wheel steering device 42 independently of the steering of the front left and right wheels 18FL and 18FR, and the rear wheel steering device 42 is controlled by the steering angle control part of the electronic control device 16.

The illustrated rear wheel steering device 42 is an electric supplementary steering device having a widely-known configuration, and includes a motor 48A, and a motion conversion mechanism 48C of, for example, a screw type, for converting a rotation of the motor 48A into a reciprocating motion of a relay rod 48B. The relay rod 48B cooperates with the tie rods 46L and 46R and a knuckle arm (not shown) to construct a turning mechanism for driving the rear left and right wheels 18RL and 18RR to turn through the reciprocating motion of the relay rod 48B.

Although not shown in the figure, the conversion mechanism 48C converts the rotation of the motor 48A into the reciprocating motion of the relay rod 48B, but is configured not to transmit, to the motor 48A, forces received by the rear left and right wheels 10RL and 10RR from a road surface and then transmitted to the relay rod 48B, and the motor 48A is thus prevented from being rotationally driven by the forces transmitted to the relay rod 48B.

In the illustrated embodiment, the electric power steering device 22 is an electric power steering device of a rack coaxial type, and includes a motor 50 and a conversion mechanism 52 of, for example, ball screw type for converting a rotational torque of the motor 50 into a force in the reciprocating direction of the rack bar 24. The electric power steering device 22 is controlled by a steering assistance control part of the electronic control device 16, and generates a supplementary steering force for driving the rack bar 24 relatively to a housing 54, thereby functioning as a steering assistance device for reducing a steering load imposed on the driver.

It should be noted that the turning angle varying device 14 may have an arbitrary configuration as long as the turning angle varying device 14 can cooperate with the supplementary steering assistance device to change the steered angles of the front left and right wheels independently of the steering operation of the driver, and to change the rotational angle of the steering wheel 20. Similarly, the steering assistance device may have an arbitrary configuration as long as the steering assistance device can generate the supplementary steering force. Moreover, the steering input means is the steering wheel 20, and an operation position thereof is a rotational angle, but the steering input means may be a steering lever of a joystick type, and the operation position in this case may be a reciprocating operation position.

As appreciated from the description given above, the turning angle varying device 14 cooperates with the electric power steering device 22 to function as first and third turn response varying means for respectively changing a gain and a derivative gain of a yaw rate of the vehicle. Moreover, the rear wheel steering device 42 functions as second and fourth turn response varying means for respectively changing a gain and a derivative gain of a lateral acceleration of the vehicle.

In the illustrated embodiment, a steering angle sensor 60 for detecting the rotational angle of the upper steering shaft 28 as a steering angle θ and a steering torque sensor 62 for detecting a steering torque Ts are provided on the upper steering shaft 28. A rotational angle sensor 64 for detecting the rotational angle of the lower steering shaft 30 as a pinion angle (rotational angle of the pinion shaft 34) φ may be installed on the lower steering shaft 30. A signal representing the steering angle θ, a signal representing the steering torque Ts, and a signal representing the pinion angle φ are input along with a signal representing a vehicle speed V detected by a vehicle speed sensor 66 to the electronic control device 16.

It should be noted that the rotational angle sensor 64 may be replaced by a rotational angle sensor for detecting a relative rotational angle θre of the turning angle varying device 14, namely, a relative rotational angle of the lower steering shaft 30 with respect to the upper steering shaft 28.

Moreover, a CCD camera 68 for imaging a front view of the vehicle is installed on the vehicle 12, and a signal representing image information on the front view of the vehicle acquired by the CCD camera 68 is also input to the electronic control device 16. It should be noted that a selection switch to be operated by an occupant of the vehicle, for selecting any one of a two-wheel steering mode and a four-wheel steering mode as a steering mode may be provided.

Each of the steering angle control part and the steering assistance control part of the electronic control device 16 may include a microcomputer including a CPU, a ROM, a RAM, and an input/output port device connected with one another via a bidirectional common bus. Moreover, the steering angle sensor 60, the steering torque sensor 62, and the rotational angle sensor 64 respectively detect the steering angle θ, the steering torque Ts, and the pinion angle φ while the steering or turning in the left turn direction of the vehicle is considered as positive.

As described in detail later, the steering angle control part of the electronic control device 16 estimates a curvature ρ and a width W of a travel path based on the image information on the front view of the vehicle acquired by the CCD camera 68 in accordance with the flowcharts illustrated in FIG. 2 and the like. Then, the steering angle control part controls the turning angle varying device 14, the electric power steering device 22, and the rear wheel steering device 42 depending on the curvature ρ and the width W of the travel path to control the steered angles of the front and rear wheels, thereby increasing a narrow path traveling performance of the vehicle.

Particularly in the first embodiment, when the magnitude of the curvature ρ of the travel path is small, the steering angle control part controls the steered angles of the front and rear wheels so that the gain of the yaw rate γ of the vehicle decreases, and the gain of the lateral acceleration Gy thereof increases with respect to the steering angle θ as the width W of the travel path decreases. Moreover, when the magnitude of the curvature ρ of the travel path is small, the steer angle control part controls the steered angles of the front and rear wheels so that the derivative gain of the yaw rate γ of the vehicle decreases, and the derivative gain of the lateral acceleration Gy thereof increases with respect to a steering angular velocity θd as the width W of the travel path decreases. Further, the steering angle control part controls the steered angles so that an attenuation gain of the yaw rate γ and an attenuation gain of the lateral acceleration Gy of the vehicle increase with respect to the steering angular velocity θd as the width W of the travel path decreases.

Moreover, when the magnitude of the curvature ρ of the travel path is large, the steering angle control part controls the steered angles of the front and rear wheels so that the derivative gain of the yaw rate γ of the vehicle decreases, and the derivative gain of the lateral acceleration Gy thereof increases with respect to the steering angular velocity θd as the width W of the travel path decreases. Moreover, the steering angle control part controls the steered angles of the front and rear wheels so that the attenuation gain of the yaw rate γ of the vehicle and the attenuation gain of the lateral acceleration Gy thereof increase with respect to the steering angular velocity θd as the width W of the travel path decreases. However, the steering angle control part does not increase or decrease the gain of the yaw rate γ of the vehicle and the gain of the lateral acceleration Gy thereof with respect to the steering angle θ based on the width W of the travel path even if the width W of the travel path is small.

Further, the steering angle control part uses the gain of the yaw rate γ and the like increased or decreased depending on necessity to calculate a target yaw rate γt and a target lateral acceleration Gy based on the steering angle θ and the steering angular velocity θd. Then, the steering angle control part calculates a target slip angle βt of the vehicle based on the target yaw rate γt and the target lateral acceleration Gy, and calculates target steered angles δft and δrt respectively for the front and rear wheels based on the target yaw rate γt and the target slip angle βt. Further, the steering angle control part controls the turning angle varying device 14 and the electric power steering device 22 so that a steered angle δf of the front wheels matches the target steered angle δft, and controls the rear wheel steering device 42 so that a steered angle δr of the rear wheels matches the target steered angle δrt.

Figure 2:
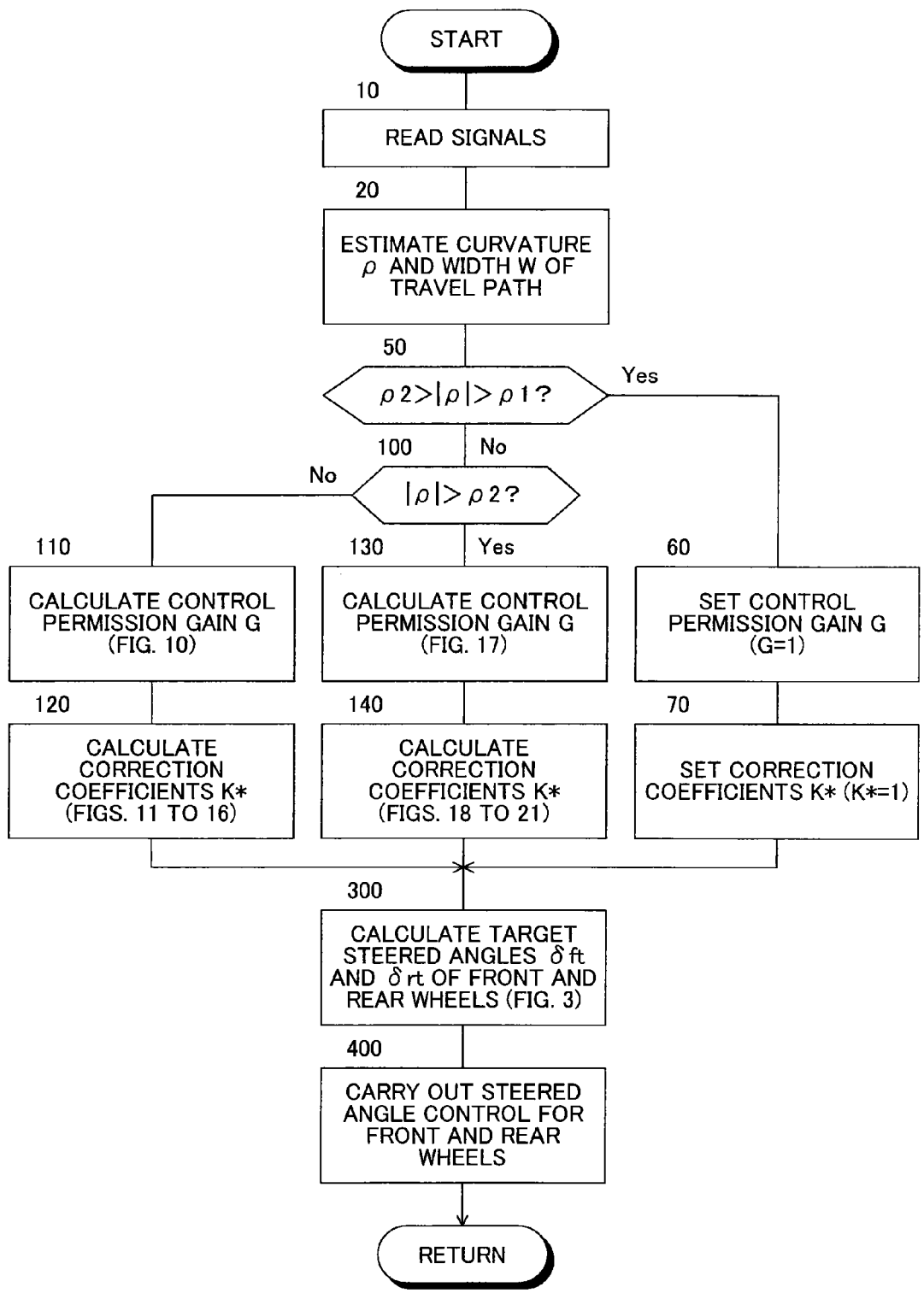
FIG. 2 is a general flowchart illustrating a steering control routine according to the first embodiment.

Now, referring to a flowchart illustrated in FIG. 2, a description is given of a steering control routine in the first embodiment. The control in accordance with the flowchart illustrated in FIG. 2 is started by closing an ignition switch (not shown), and is repeated at a predetermined interval.

First, in Step 10, the signal representing the steering angle θ detected by the steering angle sensor 60 and the like are read.

In Step 20, a travel path is identified by electrically processing the signal representing the image information on the front view of the vehicle acquired by the CCD camera 68. The curvature ρ and the width W of the travel path at a position where the vehicle is currently traveling are estimated based on information on the identified travel path and the vehicle speed V. It should be noted that the curvature ρ of the travel path is estimated while the left turn direction is considered as positive.

In Step 50, a determination is made on whether or not the absolute value of the curvature ρ of the travel path is larger than a first reference value ρ1, and is smaller than a second reference value ρ2. When a negative determination is made, the control proceeds to Step 100, and when an affirmative determination is made, the control proceeds to Step 60. It should be noted that the reference values ρ1 and ρ2 may respectively be positive constants.

In Step 60, a control permission gain G representing a degree of permitting the control is set to 1, and, in Step 70, correction coefficients K* for gains Ga* of the yaw rate γ and the like of the vehicle with respect to the steering operation are set to 1.

It should be noted that the gains Ga* include the gains Gay and Gag of the yaw rate γ and the lateral acceleration Gy of the vehicle with respect to the steering operation, the derivative gains Gayd and Gagd of the yaw rate γ and the lateral acceleration Gy with respect to the steering speed, and the attenuation gains Gaym and Gagm of the yaw rate γ and the lateral acceleration Gy with respect to the steering speed. Thus, * generally represents y, g, yd, gd, ym, and gm.

In Step 100, whether or not the absolute value of the curvature ρ of the travel path is larger than the second reference value ρ2 is determined. Then, when an affirmative determination is made, the control proceeds to Step 130. When a negative determination is made, that is, when the absolute value of the curvature ρ of the travel path is equal to or less than the first reference value ρ1, the control proceeds to Step 110.

Figure 10:
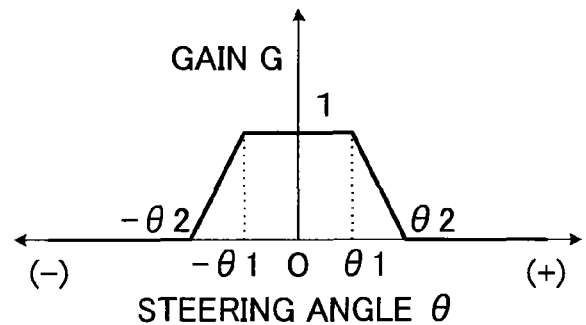
FIG. 10 is a diagram illustrating a map for calculating a control permission gain G based on a steering angle θ.
Figure 11:
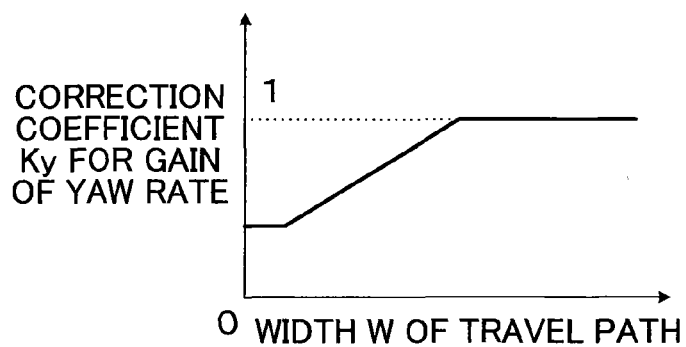
FIG. 11 is a diagram illustrating a map for calculating a correction coefficient Ky for a gain Gay of a yaw rate γ based on a width W of a travel path.
Figure 12:
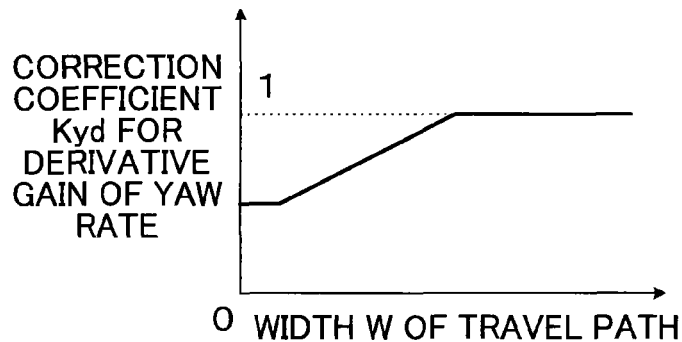
FIG. 12 is a diagram illustrating a map for calculating a correction coefficient Kyd for a derivative gain Gayd of the yaw rate γ based on the width W of the travel path.
Figure 13:
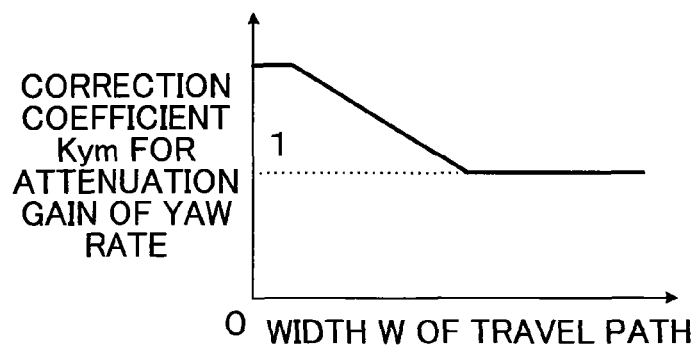
FIG. 13 is a diagram illustrating a map for calculating a correction coefficient Kym for an attenuation gain Gaym of the yaw rate γ based on the width W of the travel path.
Figure 14:
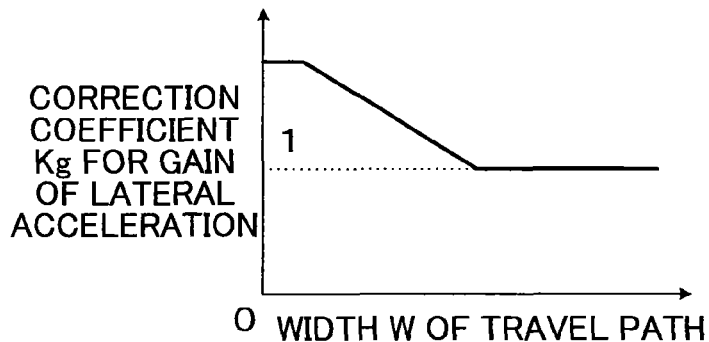
FIG. 14 is a diagram illustrating a map for calculating a correction coefficient Kg for a gain Gag of a lateral acceleration based on the width W of the travel path.
Figure 15:
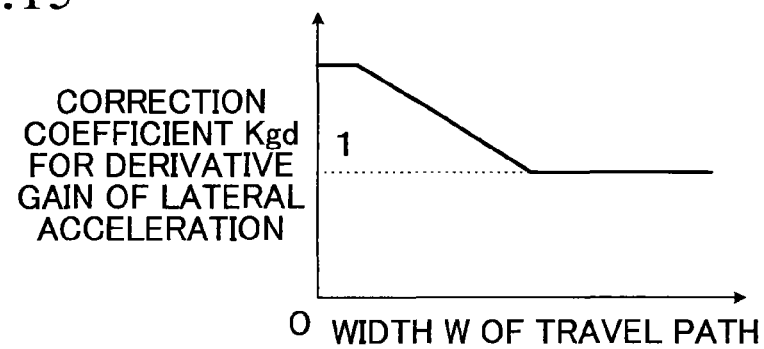
FIG. 15 is a diagram illustrating a map for calculating a correction coefficient Kgd for a derivative gain Gagd of the lateral acceleration based on the width W of the travel path.
Figure 16:
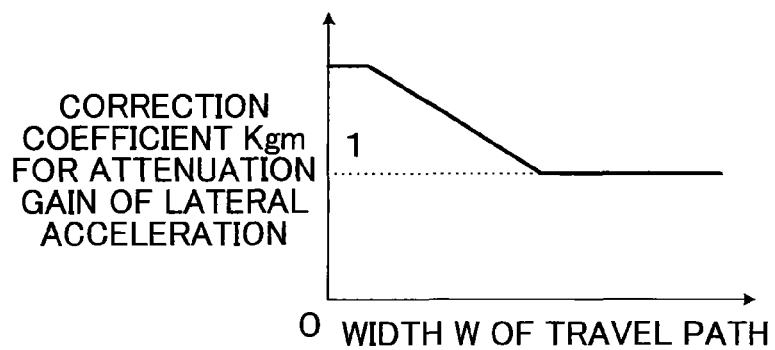
FIG. 16 is a diagram illustrating a map for calculating a correction coefficient Kgm for an attenuation gain Gagm of the lateral acceleration based on the width W of the travel path.

In Step 110, the control permission gain G is calculated based on the steering angle θ from a map illustrated in FIG. 10. As illustrated in FIG. 10, the control permission gain G is calculated as 1 when the absolute value of the steering angle θ is equal to or less than a first reference value θ1, and is calculated as 0 when the absolute value of the steering angle θ is equal to or more than a second reference value θ2. Moreover, the control permission gain G is calculated so as to decrease as the absolute value of the steering angle θ increases when the absolute value of the steering angle θ is more than the first reference value θ1 and less than the second reference value θ2.

In Step 120, the correction coefficients K* for the gain Gay of the yaw rate γ of the vehicle with respect to the steering operation and the like are calculated based on the width W of the travel path from maps illustrated in FIGS. 11 to 16. In other words, a correction coefficient Ky for the gain Gay, a correction coefficient Kyd for the derivative gain Gayd, and a correction coefficient Kym for the attenuation gain Gaym are calculated from the maps respectively illustrated in FIGS. 11 to 13. Moreover, a correction coefficient Kg for the gain Gag, a correction coefficient Kgd for the derivative gain Gagd, and a correction coefficient Kgm for the attenuation gain Gagm are calculated from the maps respectively illustrated in FIGS. 14 to 16. In this case, the correction coefficients Ky and Kyd are calculated so as to decrease from 1 as the width W of the travel path decreases, and the correction coefficients Kym, Kg, Kgd, and Kgm are calculated so as to increase from 1 as the width W of the travel path decreases.

Figure 17:
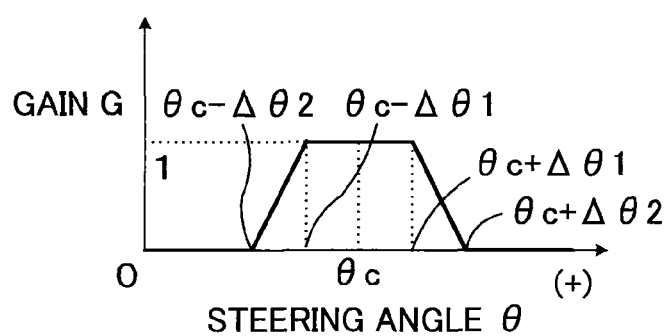
FIG. 17 is a diagram illustrating a map for calculating a control permission gain G based on a steering angle θ.
Figure 18:
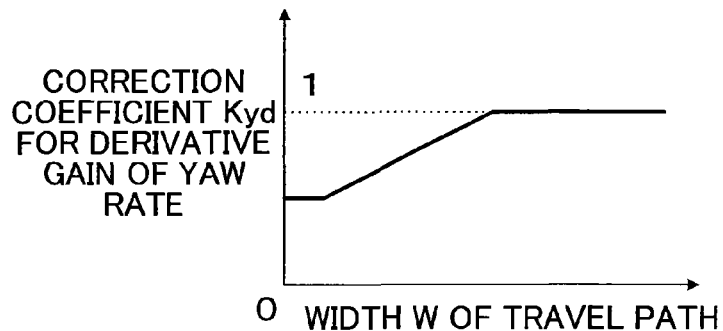
FIG. 18 is a diagram illustrating a map for calculating a correction coefficient Kyd for a derivative gain Gayd of the yaw rate γ based on the width W of the travel path.
Figure 19:
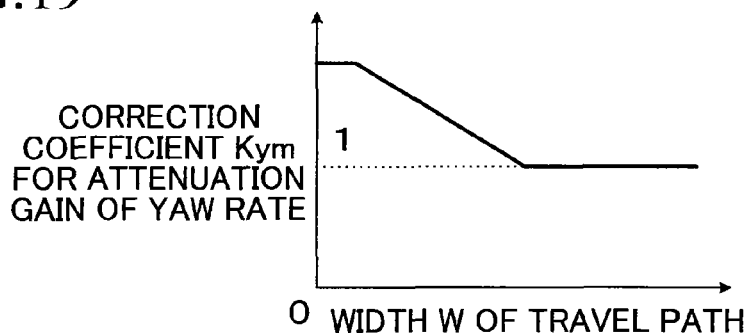
FIG. 19 is a diagram illustrating a map for calculating a correction coefficient Kym for an attenuation gain Gaym of the yaw rate γ based on the width W of the travel path.
Figure 20:
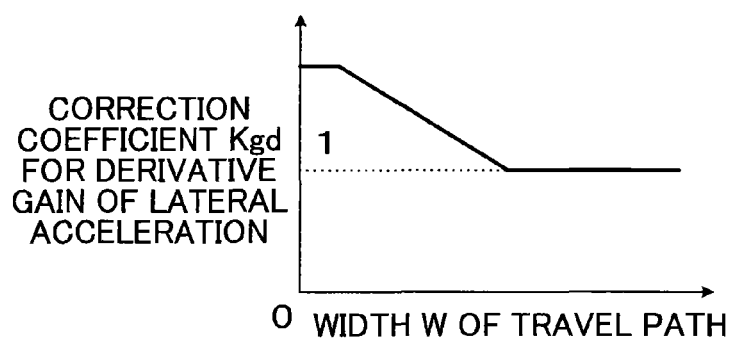
FIG. 20 is a diagram illustrating a map for calculating a correction coefficient Kgd for a derivative gain Gagd of the lateral acceleration based on the width W of the travel path.
Figure 21:
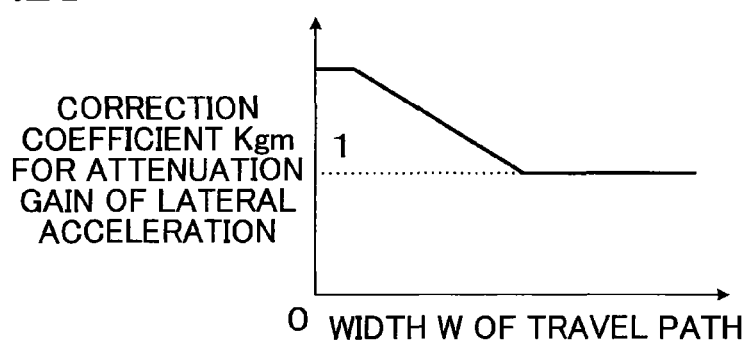
FIG. 21 is a diagram illustrating a map for calculating a correction coefficient Kgm for an attenuation gain Gagm of the lateral acceleration based on the width W of the travel path.

In Step 130, the control permission gain G is calculated based on the steering angle θ from a map illustrated in FIG. 17. It should be noted that, in FIG. 17, a steering angle θc is a steering angle for the vehicle to travel on the travel path having the curvature ρ estimated in Step 20, Δθ1 is a positive constant, and Δθ2 is a positive constant larger than Δθ1.

As illustrated in FIG. 17, the control permission gain G is calculated as 0 when the steering angle θ is equal to or less than a first reference value θc−Δθ2 or equal to or more than a fourth reference value θc+Δθ2, and is calculated as 1 when the steering angle θ is equal to or more than a second reference value θc−Δθ1 and equal to or less than a third reference value θc+Δθ1. Moreover, the control permission gain G is calculated so as to increase as the steering angle θ increases when the steering angle θ is more than the first reference value θc−Δθ2 and less than the second reference value θc−Δθ1. Further, the control permission gain G is calculated so as to decrease as the steering angle θ increases when the steering angle θ is more than the third reference value θc+Δθ1 and less than the fourth reference value θc+Δθ2.

In Step 140, the correction coefficients Ky and Kg for the gain Gay and the gain Gag are set to 1, and the correction coefficients K* for the derivative gain Gayd of the yaw rate γ of the vehicle with respect to the steering operation and the like are calculated based on the width W of the travel path from maps illustrated in FIGS. 18 to 21. In other words, the correction coefficient Kyd for the derivative gain Gayd and the correction coefficient Kym for the attenuation gain Gaym are calculated respectively from the maps illustrated in FIGS. 18 and 19. Moreover, the correction coefficient Kgd for the derivative gain Gagd and the correction coefficient Kgm for the attenuation gain Gagm are calculated respectively from the maps illustrated in FIGS. 20 and 21. In this case, the correction coefficients Kyd is calculated so as to decrease from 1 as the width W of the travel path decreases, and the correction coefficients Kym, Kgd, and Kgm are calculated so as to increase from 1 as the width W of the travel path decreases.

Figure 3:
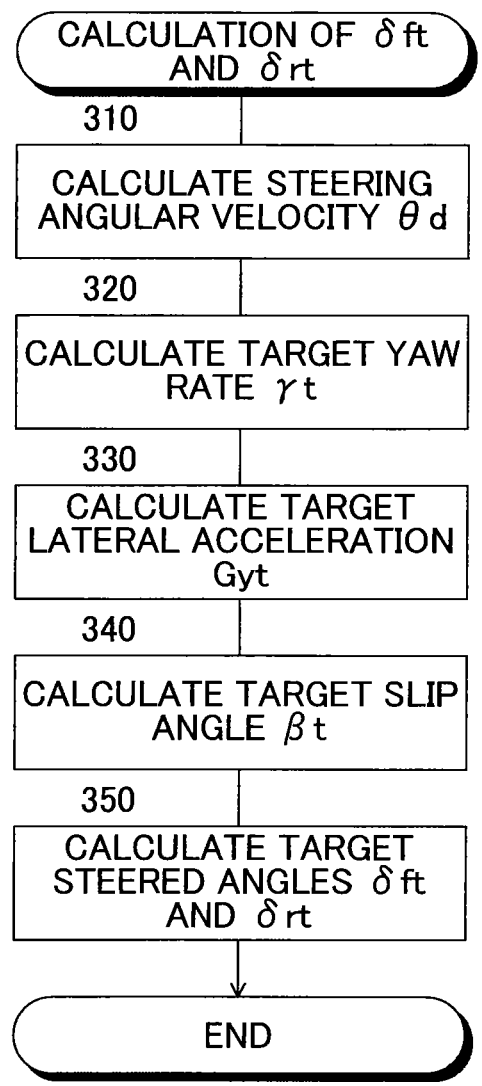
FIG. 3 is a flowchart illustrating a routine for a target steered angle calculation for front and rear wheels in Step 300 of FIG. 2.

When Step 70, 120, or 140 is finished, the control proceeds to Step 300, and, in Step 300, the target steered angles δft and δrt for the front and rear wheels are calculated in accordance with the flowchart illustrated in FIG. 3.

In Step 400, the turning angle varying device 14 is controlled so that the steered angle of the front wheels 18FL and 18FR matches the target steered angle δft, and the rear wheel steering device 42 is controlled so that the steered angle of the rear wheels 18RL and 18RR matches the target steered angle δrt.

Now, referring to a flowchart illustrated in FIG. 3, a description is given of a target steered angle calculation routine for the front and rear wheels in Step 300.

First, in Step 310, the steering angular velocity θd is calculated, for example, as a time derivative of the steering angle θ.

In Step 320, the target yaw rate γt of the vehicle is calculated in accordance with Equation 1 based on the steering angle θ and the steering angular velocity θd. It should be noted that, in Equation 1, Gay0 is a default value of the gain Gay of the yaw rate γ of the vehicle with respect to the steering angle θ, and Gayd0 and Gaym0 are respectively default values of the derivative gain Gayd and the attenuation gain Gaym of the yaw rate γ of the vehicle with respect to the steering angular velocity θd.

$$\gamma t = \{Ky \cdot G + (1-G)\}Gay0 \cdot \theta + \{Kyd \cdot G + (1-G)\}Gayd0 \cdot \theta d + \{Kym \cdot G + (1-G)\}Gaym0 \cdot \theta d \quad (1)$$

In Step 330, the target lateral acceleration Gyt of the vehicle is calculated in accordance with Equation 2 based on the steering angle θ and the steering angular velocity θd. It should be noted that, in Equation 2, Gag0 is a default value of the gain Gag of the lateral acceleration Gy of the vehicle with respect to the steering angle θ, and Gagd0 and Gagm0 are respectively default values of the derivative gain Gagd and the attenuation gain Gagm of the lateral acceleration Gy of the vehicle with respect to the steering angular velocity θd.

$$Gyt = \{Kg \cdot G + (1-G)\}Gag0 \cdot \theta + \{Kgd \cdot G + (1-G)\}Gagd0 \cdot \theta d + \{Kgm \cdot G + (1-G)\}Gagm0 \cdot \theta d \quad (2)$$

In Step 340, the target slip angle βt of the vehicle is calculated based on the target yaw rate γt and the target lateral acceleration Gyt of the vehicle in accordance with Equation 3.

$$\beta t = \int \{(Gyt/V) - \gamma t\} dt \quad (3)$$

In Step 350, the target steered angle δft for the front wheels and the target steered angle δrt for the rear wheels are calculated based on the target yaw rate γt and the target slip angle δt of the vehicle in accordance with Equation 4. It should be noted that, in Equation 4, s is the Laplacian, Cf and Cr are respectively cornering powers of the front and rear wheels, and I is a yaw moment of inertia about the center of gravity of the vehicle. Moreover, m is the mass of the vehicle, and Lf and Lr are respectively horizontal distances in the longitudinal direction from the center of gravity of the vehicle to a front wheel axle and a rear wheel axle.

$$\begin{pmatrix} \delta ft \\ \delta rt \end{pmatrix} = \begin{pmatrix} \frac{Cf}{m \cdot V} & \frac{Cr}{m \cdot V} \\ \frac{Cf \cdot Lf}{I} & \frac{-Cr \cdot Lr}{I} \end{pmatrix}^{-1} \begin{pmatrix} s + \frac{(Cf+Cr)}{m \cdot V} & 1 + \frac{(Cf \cdot Lf - Cr \cdot Lr)}{m \cdot V^2} \\ \frac{(Cf \cdot Lf - Cr \cdot Lr)}{I} & s + \frac{(Cf \cdot Lf^2 + Cr \cdot Lr^2)}{I \cdot V} \end{pmatrix} \begin{pmatrix} \beta t \\ \gamma t \end{pmatrix} \quad (4)$$

As appreciated from the above-mentioned description, in Step 20, the travel path is identified based on the image information on the front view of the vehicle acquired by the CCD camera 68, and the curvature ρ and the width W of the travel path at the position where the vehicle is currently traveling are estimated based on the information on the identified travel path and the vehicle speed V. Then, in Step 50, whether or not the absolute value of the curvature ρ of the travel path is between the first reference value ρ1 and the second reference value ρ2 is determined, and, depending on the necessity, in Step 100, whether or not the absolute value of the curvature ρ of the travel path is larger than the second reference value ρ2 is determined.

(A1) When Absolute Value of Curvature ρ is Between First Reference Value ρ1 and Second Reference Value ρ2

In this case, in Step 50, the affirmative determination is made, and, in Steps 60 and 70, the control permission gain G is set to 1, and the correction coefficients K* for the gains Ga* are set to 1. Thus, regardless of the width W of the travel path, a ratio of the gain of the lateral acceleration to the gain of the yaw rate, and a ratio of the derivative gain of the lateral acceleration to the derivative gain of the yaw rate are not increased or decreased.

(A2) When Absolute Value of Curvature ρ is Equal to or Less than First Reference Value ρ1

In this case, in Steps 50 and 100, the negative determinations are made, and in Step 110, when the steering angle θ is in a neighborhood of 0, the control permission gain G is set to 1, and the correction coefficients K* of the gains Ga* are set to be variable depending on the width W of the travel path.

Particularly, the correction coefficients K* are set to be variable so that the gain of the yaw rate γ of the vehicle decreases, and the gain of the lateral acceleration Gy thereof increases with respect to the steering angle θ as the width W of the travel path decreases. Moreover, the correction coefficients K* are set to be variable so that the derivative gain of the yaw rate γ of the vehicle decreases, and the derivative gain of the lateral acceleration Gy thereof increases with respect to the steering angular velocity θd as the width W of the travel path decreases.

Thus, when the magnitude of the curvature of the travel path is equal to or less than the first reference value, the ratio of the gain of the lateral acceleration to the gain of the yaw rate increases, and the ratio of the derivative gain of the lateral acceleration to the derivative gain of the yaw rate increases as the width of the travel path decreases. Thus, under a state in which the vehicle travels on a narrow path, the position of the vehicle in the lateral direction with respect to the travel path can be effectively controlled while the generation of the yaw angle is suppressed, resulting in an effective increase in the narrow path traveling performance of the vehicle compared with a related-art steering control device.

Moreover, the generation of the yaw angle caused by the steering operation can be suppressed, and the turn of the vehicle with respect to the travel path generated by the steering operation to control the position of the vehicle in the lateral direction with respect to the travel path can thus be decreased. Thus, the correction steering required to correct the direction of the vehicle with respect to the travel path can be decreased compared with the related-art steering control device, which can also increase the narrow path traveling performance of the vehicle.

(A3) When Absolute Value of Curvature ρ is Larger than Second Reference Value ρ2

In this case, in Step 50, the negative determination is made, and, in Step 100, the affirmative determination is made. Then, in Step 130, the steering angle for the vehicle to travel on the travel path having the curvature ρ is set to θc, the control permission gain G when the steering angle θ is in the neighborhood of θc is set to 1, and the correction coefficients K* for the gains G* are set to be variable depending on the width W of the travel path.

Thus, when the magnitude of the curvature of the travel path is larger than the second reference value ρ2, the ratio of the derivative gain of the lateral acceleration to the derivative gain of the yaw rate increases as the width of the travel path decreases. Thus, under the state in which the vehicle travels on the narrow path, the position of the vehicle in the lateral direction with respect to the travel path can be effectively controlled while the generation of the yaw angle is suppressed, resulting in an effective increase in the narrow path traveling performance of the vehicle compared with a related-art steering control device. Moreover, the correction steering required to correct the direction of the vehicle with respect to the travel path can be decreased, which can also increase the narrow path traveling performance of the vehicle.

Moreover, when the magnitude of the curvature of the travel path is larger than the second reference value $\rho 2$, the gain of the yaw rate $\gamma$ and the gain of the lateral acceleration Gy of the vehicle with respect to the steering angle $\theta$ are not increased or decreased based on the width W of the travel path, and the ratio of the gain of the lateral acceleration with respect to the gain of the yaw rate is also not increased or decreased. Thus, under the state in which the vehicle turns or meanders along a narrow path, the turn radius of the vehicle can be effectively prevented from being changed by the changes in the gain of the yaw rate and the gain of the lateral acceleration of the vehicle with respect to the steering operation.

(A4) Attenuation Gain of Yaw Rate $\gamma$ and Attenuation Gain of Lateral Acceleration Gy When the absolute value of the curvature $\rho$ is equal to or less than the first reference value $\rho 1$, and when the absolute value of the curvature $\rho$ is larger than the second reference value $\rho 2$, the correction coefficients K* are set to be variable so that the attenuation gain of the yaw rate $\gamma$ and the attenuation gain of the lateral acceleration Gy of the vehicle increase with respect to the steering angular velocity $\theta d$ as the width W of the travel path decreases.

In general, when the steering operation is carried out, if the yaw rate $\gamma$ and the lateral acceleration Gy of the vehicle overshoot the target values, a correction steering to handle the overshoots thus becomes necessary. The overshoots of the yaw rate $\gamma$ and the lateral acceleration Gy of the vehicle tend to occur as the magnitude of the steering operation increases, and the steering speed increases. Moreover, the necessity of the correction steering to handle the overshoots of the yaw rate $\gamma$ and the lateral acceleration Gy of the vehicle increases as the width of the travel path decreases.

According to the first embodiment, the attenuation gain of the yaw rate $\gamma$ and the attenuation gain of the lateral acceleration Gy of the vehicle increase as the width W of the travel path decreases. Thus, the correction steering to handle the overshoots beyond the target values of the yaw rate $\gamma$ and the lateral acceleration Gy of the vehicle can be decreased when the steering operation is carried out, which also increases the narrow path traveling performance of the vehicle.

In the first embodiment, when the absolute value of the curvature $\rho$ is between the first reference value $\rho 1$ and the second reference value $\rho 2$, the correction coefficients K* are set to 1 both for the attenuation gain of the yaw rate $\gamma$ and the attenuation gain of the lateral acceleration Gy of the vehicle with respect to the steering angular velocity $\theta d$. However, even when the absolute value of the curvature $\rho$ is between the first reference value $\rho 1$ and the second reference value $\rho 2$, the correction coefficients K* may be set to be variable so that the attenuation gain of the yaw rate $\gamma$ and the attenuation gain of the lateral acceleration Gy of the vehicle increase with respect to the steering angular velocity $\theta d$ as the width W of the travel path decreases. This holds true for other embodiments described later.

Moreover, although not shown in the figure, when such a determination that the driver has presented an intention to exist from the travel path is made, the steering control in accordance with the flowchart illustrated in FIG. 2 is finished. In this case, when a turn signal is operated, the magnitude of the steering torque Ts, the steering angle $\theta$, or the steering angular velocity $\theta d$ is larger than a determination reference set in advance, or the vehicle crosses a lane marking, such a determination that the driver presents the intention to exist the travel path may be made. This also holds true for other embodiments described later.

[Second Embodiment]

Figure 4:
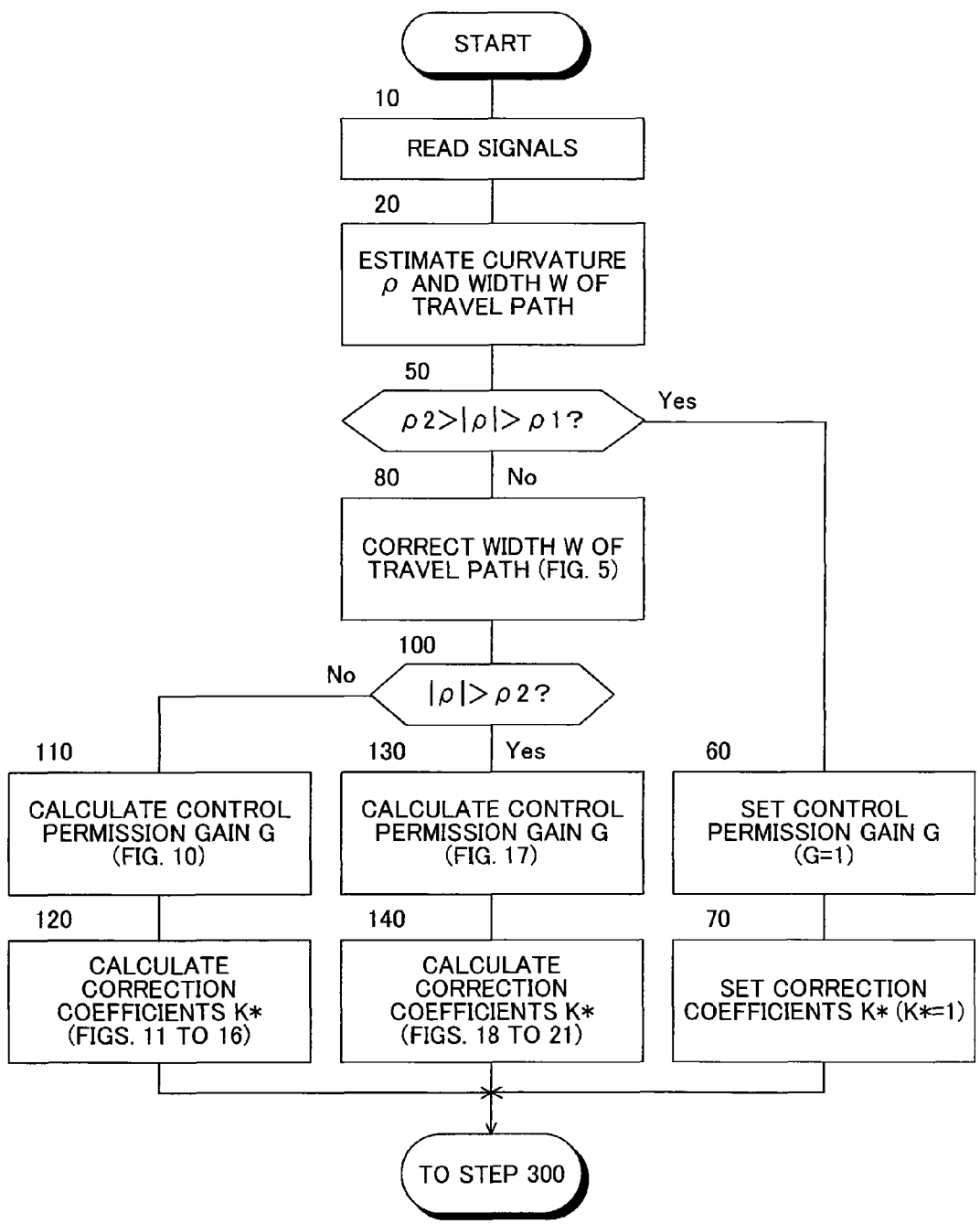
FIG. 4 is a flowchart illustrating a principal part of a steering control routine of a vehicle steering control device according to a second embodiment of the present invention applied to the four-wheel steering vehicle.

FIG. 4 is a flowchart illustrating a principal part of a control routine for steered angles of front and rear wheels of a vehicle steering control device according to a second embodiment of the present invention applied to the four-wheel steering vehicle. It should be noted that, in FIG. 4, the same step as the step illustrated in FIG. 2 is denoted by the same step number as the step number assigned in FIG. 2. This holds true for other embodiments described later.

As appreciated from a comparison between FIG. 4 and FIG. 2, in the second embodiment, when the negative determination is made in Step 50, Step 80 is carried out, and then the control proceeds to Step 100. It should be noted that steps other than Step 80 are carried out executed in the same manner as in the first embodiment.

In Step 80, as described below in accordance with the flowchart illustrated in FIG. 5, the correction of the width W of the travel path (calculation of a width Wc of a travel path for control) used for the calculation for the correction coefficients K* is carried out.

First, in Step 82, such a determination that whether or not the width Wc of the travel path for control is being calculated based on the width Wc of the travel path for control set in Step 86 or 90 described later is made. Then, when the affirmative determination is made, the control proceeds to Step 92, and when the negative determination is made, the control proceeds to Step 84.

In Step 84, whether or not the width of the travel path rapidly decreases in a range from the current position of the vehicle to a position at a distance set in advance is determined based on the information on the travel path identified in Step 20. Then, when a negative determination is made, the control proceeds to Step 88, and when an affirmative determination is made, the control proceeds to Step 86.

In Step 86, a distance La from the current position of the vehicle to a position where the rapid decrease in the width starts, and a distance Lb from the current position of the vehicle to a position where the rapid decrease in the width ends are estimated. Moreover, as illustrated by the solid line in FIG. 22, based on a width Wa of the travel path before the width rapidly decreases and a width Wb of the travel path after the width rapidly decreases, the width Wc of the travel path for control is set as a map so as to decrease earlier and more gently than the width W of the actual travel path.

In Step 88, whether or not the width of the travel path rapidly increases in a range from the current position of the vehicle to a position at a distance set in advance is determined based on the information on the travel path identified in Step 20. Then, when a negative determination is made, the control proceeds to Step 100, and when an affirmative determination is made, the control proceeds to Step 90.

Figure 23:
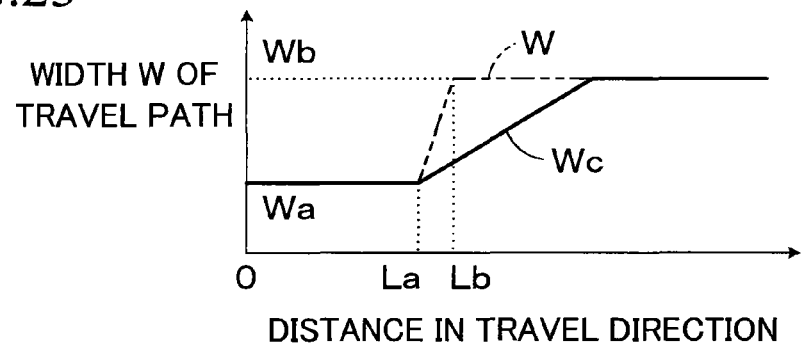
FIG. 23 is a diagram illustrating a procedure set as a map so that, in a case where the width W of the actual travel path rapidly increases, the width Wc of the travel path for control changes more gently than the width W of the actual travel path.

In Step 90, a distance La from the current position of the vehicle to a position where the rapid increase in the width starts, and a distance Lb from the current position of the vehicle to a position where the rapid increase in the width ends are estimated. Moreover, as illustrated in FIG. 23, based on a width Wa of the travel path before the width rapidly increases and a width Wb of the travel path after the width rapidly increases, the width Wc of the travel path for control is set as a map so as to increase earlier and more gently than the width W of the actual travel path.

It should be noted that the determination on whether or not the width rapidly decreases or increases made in Step 84 or 88 may be a determination on whether or not, for example, a ratio of a change amount in the width to a reference distance set in advance in the longitudinal direction of the travel path is equal to or more than a reference value. Moreover, when the width of the travel path changes stepwise, the distances La and Lb may be the same value. Further, a degree of gently changing the width Wc of the travel path for control may be constant or may be set to be variable so as to become gentler as a magnitude of a difference between the widths Wa and Wb increases.

In Step 92, based on an elapsed time from a time point when the width Wc of the travel path for control is set in Step 86 or 90 and the vehicle speed V, a travel distance Lv of the vehicle from that time point is calculated. Then, the width Wc of the travel path for control is calculated based on the travel distance Lv from the map illustrated in FIG. 22 or 23, the width Wc of the travel path is set to the width W of the travel path after the correction, and then the control proceeds to Step 100.

As appreciated from the description given before, in the second embodiment, the steps other than Step 80 are carried out similarly to the case of the first embodiment. Thus, the second embodiment can provide the same actions and effects as those of the first embodiment. In other words, under the state in which the vehicle travels on a narrow path, the position of the vehicle in the lateral direction with respect to the travel path can be effectively controlled while the generation of the yaw angle is suppressed, and the correction steering required to correct the direction of the vehicle with respect to the travel path can be decreased.

Figure 5:
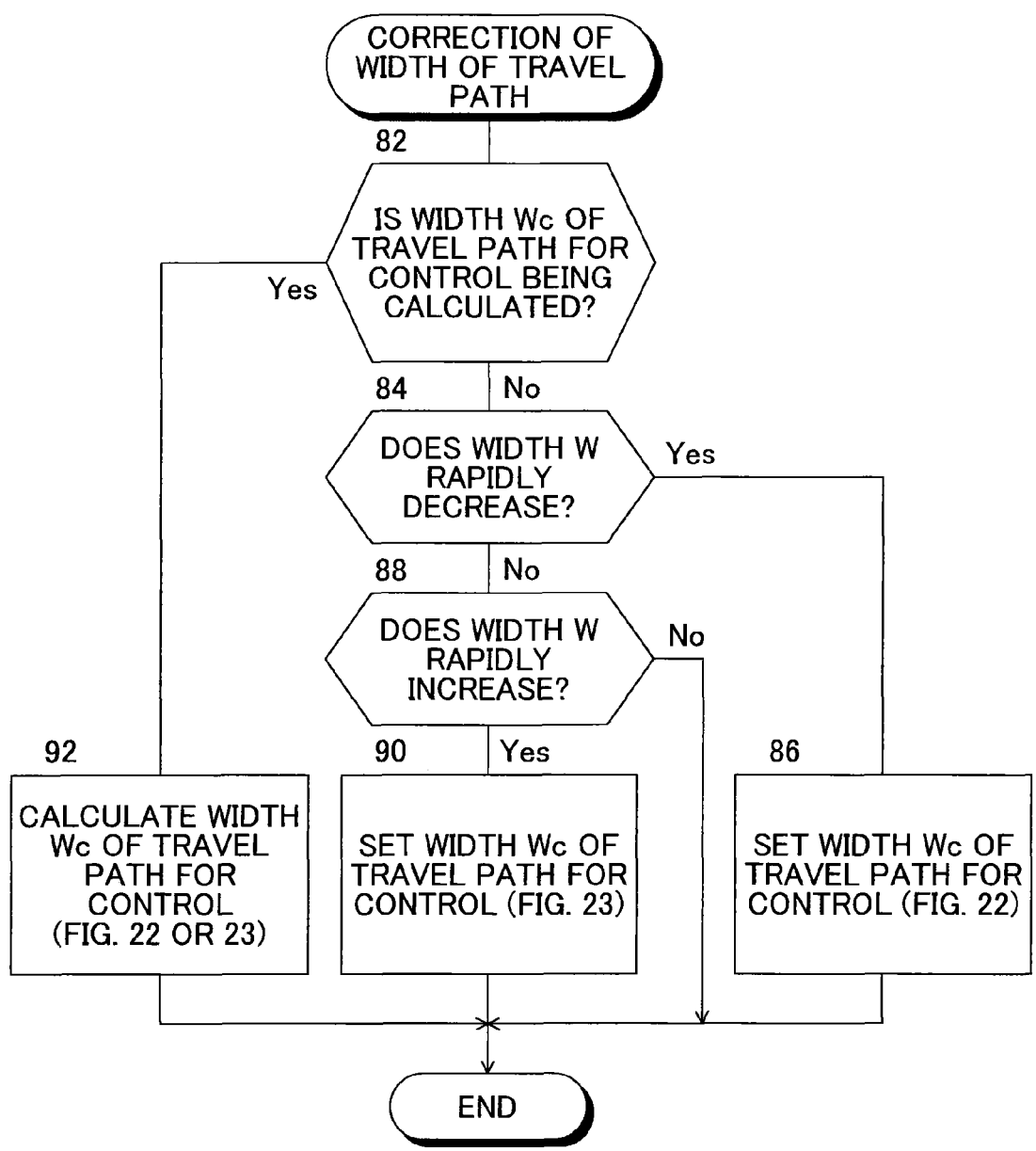
FIG. 5 is a flowchart illustrating a routine of correcting a width of a travel path in Step 80 of FIG. 4.

Particularly in the second embodiment, in Step 80, the width Wc of the travel path for control is calculated in accordance with the flowchart illustrated in FIG. 5, resulting in the correction of the width W of the travel path used for calculating the correction coefficients K*.

(B1) When Width of Travel Path Rapidly Decreases

In this case, first in Step 82, the negative determination is made, and, in Step 84, the affirmative determination is made. Then, in Step 86, based on the widths Wa and Wb of the travel path respectively before and after the width rapidly decreases, as illustrated as the solid line in FIG. 22, the width Wc of the travel path for control is set as a map so as to decrease earlier and more gently than the width W of the actual travel path. Then, in Step 82, an affirmative determination is made, and, in Step 92, the width Wc of the travel path for control is calculated based on the travel distance Lv from the time point when the width Wc of the travel path for control is set from the map illustrated in FIG. 22, and the width Wc is set to the width W of the travel path after the correction. As a result, the correction coefficients K* are calculated based on the width W of the travel path after the correction.

Thus, when the width of the travel path rapidly decreases, the correction coefficients K* can be changed earlier and more gently than the change corresponding to the width W of the actual travel path. As a result, the ratio of the gain of the lateral acceleration to the gain of the yaw rate and the ratio of the derivative gain of the lateral acceleration to the derivative gain of the yaw rate can be changed earlier and more gently than in the case of the first embodiment.

Thus, when the width of the travel path rapidly decreases, it is possible to decrease a sense of discomfort caused by a rapid change in the turn response of the vehicle due to the change of decrease in the width of the travel path, and, moreover, the driver can get used to the operability of the vehicle suited to the travel on the narrow path before the width of the travel path actually decreases.

(B2) When Width of Travel Path Rapidly Increases

In this case, first in Steps 82 and 84, the negative determinations are made, and, in Step 88, the affirmative determination is made. Then, in Step 90, based on the widths Wa and Wb of the travel path respectively before and after the width rapidly increases, as illustrated in FIG. 23, the width Wc of the travel path for control is set as a map so as to increase more gently than the width W of the actual travel path. Then, in Step 82, an affirmative determination is made, and, in Step 92, the width Wc of the travel path for control is calculated based on the travel distance Lv from the time point when the width Wc of the travel path for control is set from the map illustrated in FIG. 23, and the width Wc is set to the width W of the travel path after the correction. As a result, the correction coefficients K* are calculated based on the width W of the travel path after the correction.

Thus, when the width of the travel path rapidly increases, the correction coefficients K* can be changed more gently than the change corresponding to the width W of the actual travel path. As a result, the ratio of the gain of the lateral acceleration to the gain of the yaw rate and the ratio of the derivative gain of the lateral acceleration to the derivative gain of the yaw rate can be changed more gently than in the case of the first embodiment.

Thus, when the width of the travel path rapidly increases, it is possible to decrease a sense of discomfort caused by a rapid change in the turn response of the vehicle due to the change of increase in the width of the travel path. Moreover, for example, compared with the case where the change in the correction coefficients K* starts, for example, from a stage at which the vehicle is traveling on a narrow path, such a fear that the narrow path traveling performance of the vehicle is decreased by the changes in the ratio of the gain and the ratio of the derivative gain can be securely decreased.

(B3) When Width of Travel Path does not Rapidly Change

In this case, the negative determinations are made in Steps 82, 84, and 88. Thus, the width Wc of the travel path for control is not calculated, and the width W of the travel path used for calculating the correction coefficients K* is thus not corrected. Thus, the correction coefficients K* are calculated based on the width W of the travel path.

In this way, in the second embodiment, the correction coefficients K* are calculated based on the width W of the travel path corrected depending on necessity. Thus, the narrow path traveling performance of the vehicle under the state in which the width W of the travel path changes can be increased compared with the case of the first embodiment while such a fear that the driver feels the sense of discomfort caused by the change in the width W of the travel path is decreased.

Figure 22:
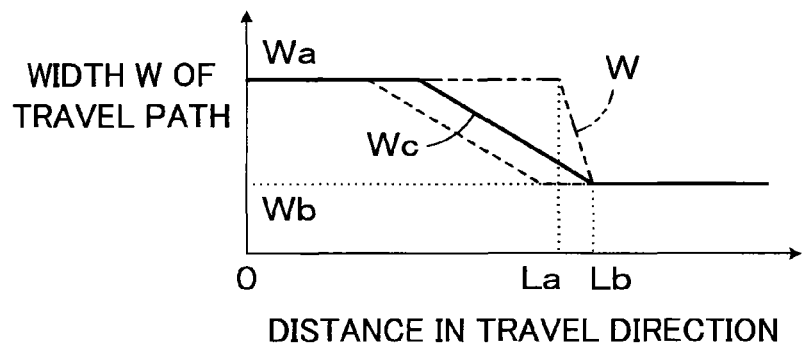
FIG. 22 is a diagram illustrating a procedure set as a map so that, in a case where a width W of an actual travel path rapidly decreases, a width Wc of a travel path for control changes earlier and more gently than the width W of the actual travel path.

As illustrated as the broken line in FIG. 22, the width Wc of the travel path for control set in Step 86 may be set so that the width Wc of the travel path for control decreases earlier and more gently than the width W of the actual travel path, and the decrease completes earlier than the width W of the actual travel path. In this case, the driver can get used to the operability of the vehicle suitable for the travel on a narrow path before the width of the travel path actually decreases more securely than that in the second embodiment. This correction example is herein referred to as "first correction example".

[Third Embodiment]

Figure 6:
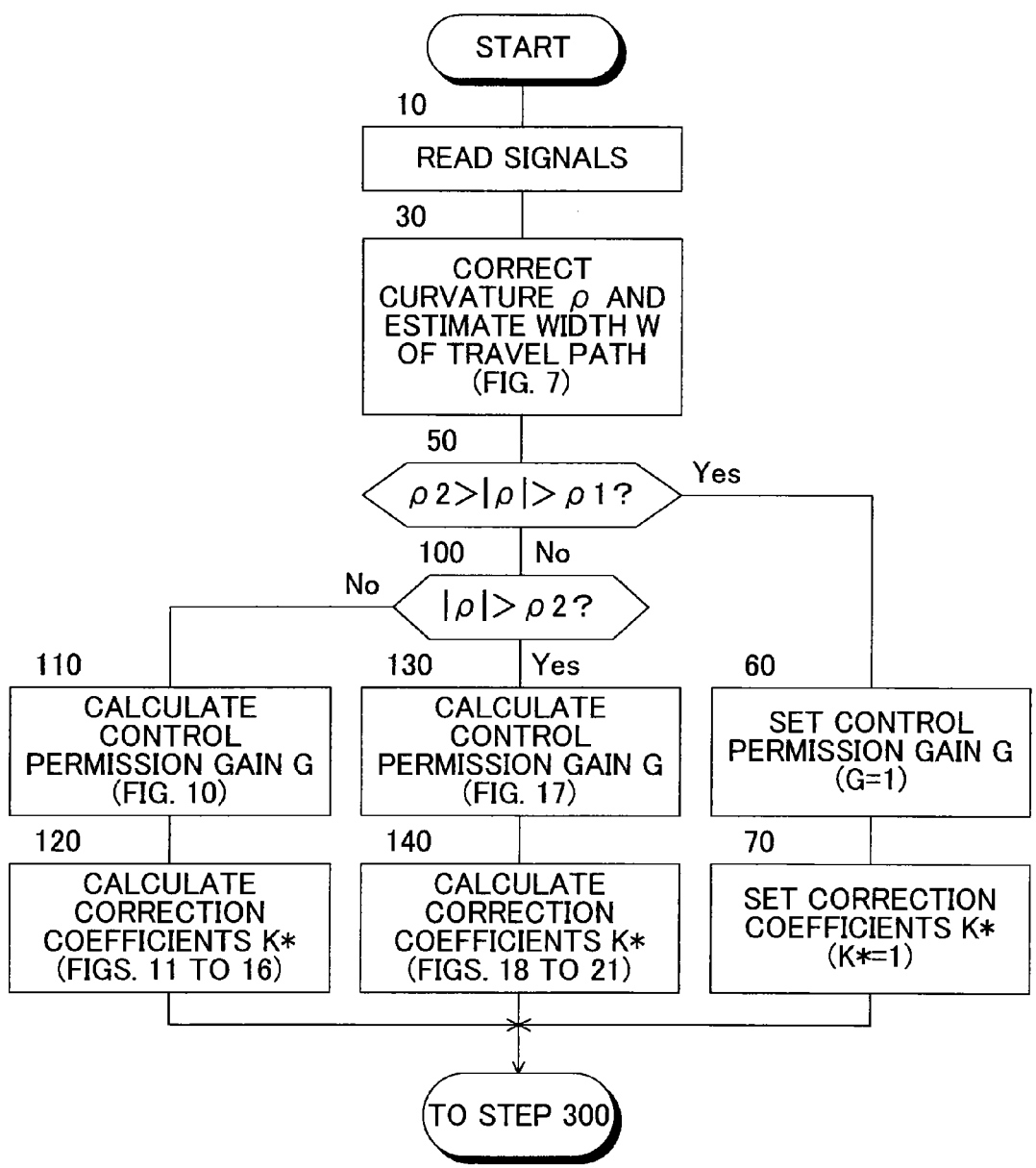
FIG. 6 is a flowchart illustrating a principal part of a steering control routine of a vehicle steering control device according to a third embodiment of the present invention applied to the four-wheel steering vehicle.

FIG. 6 is a flowchart illustrating a principal part of a control routine for steered angles of front and rear wheels of a vehicle steering control device according to a third embodiment of the present invention applied to the four-wheel steering vehicle.

As appreciated from a comparison between FIG. 6 and FIG. 2, in the third embodiment, Step 30 is carried out in place of Step 20, and then the control proceeds to Step 50. It should be noted that steps other than Step 30 are carried out in the same manner as in the first embodiment.

In Step 30, as described below in accordance with the flowchart illustrated in FIG. 7, the correction of the curvature $\rho$ of the travel path (calculation of a curvature $\rho c$ of a travel path for control) used for the determinations in Steps 50 and 100 is carried out.

First, in Step 32, such a determination that whether or not the curvature $\rho c$ of the travel path for control is being calculated based on the curvature $\rho c$ of the travel path for control set in Step 36 or 40 described later. Then, when the affirmative determination is made, the control proceeds to Step 42, and when the negative determination is made, the control proceeds to Step 34.

In Step 34, the travel path is identified similarly to the case of Step 20 of the first embodiment, and whether or not the curvature of the travel path increases in a range from the current position of the vehicle to a position at a distance set in advance is determined based on the information on the identified travel path. Then, when a negative determination is made, the control proceeds to Step 38, and when an affirmative determination is made, the control proceeds to Step 36.

Figure 24:
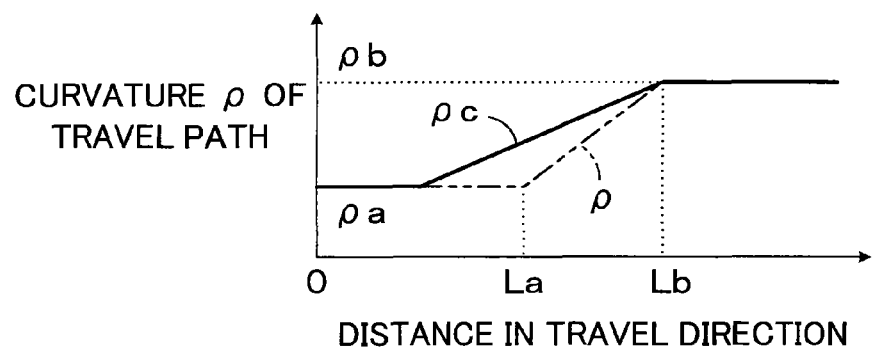
FIG. 24 is a diagram illustrating a procedure set as a map so that, in a case where a curvature ρ of the actual travel path increases, a curvature ρc of the travel path for control changes earlier and more gently than the curvature ρ of the actual travel path.

In Step 36, a distance La from the current position of the vehicle to a position where the increase in the curvature starts, and a distance Lb from the current position of the vehicle to a position where the increase in the curvature ends are estimated. Moreover, as illustrated in FIG. 24, based on a curvature $\rho a$ of the travel path before the curvature increases and a curvature $\rho b$ of the travel path after the curvature increases, the curvature $\rho c$ of the travel path for control is set as a map so as to increase earlier and more gently than the curvature $\rho$ of the actual travel path.

In Step 38, whether or not the curvature of the travel path decreases in a range from the current position of the vehicle to a position at a distance set in advance is determined based on the information on the travel path identified in Step 34. Then, when a negative determination is made, the control proceeds to Step 100, and when an affirmative determination is made, the control proceeds to Step 40.

Figure 25:
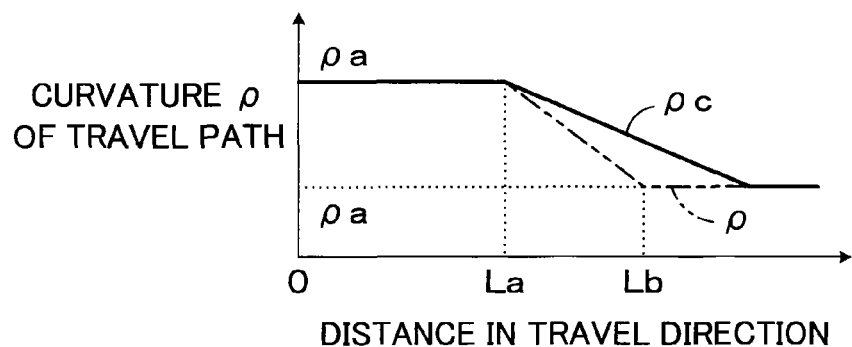
FIG. 25 is a diagram illustrating a procedure set as a map so that, in a case where the curvature ρ of the actual travel path decreases, the curvature ρc of the travel path for control changes more gently than the curvature ρ of the actual travel path.

In Step 40, a distance La from the current position of the vehicle to a position where the decrease in the curvature starts, and a distance Lb from the current position of the vehicle to a position where the decrease in the curvature ends are estimated. Moreover, as illustrated in FIG. 25, based on a curvature $\rho a$ of the travel path before the curvature decreases and a curvature $\rho b$ of the travel path after the curvature decreases, the curvature $\rho c$ of the travel path for control is set as a map so as to decrease more gently than the curvature $\rho$ of the actual travel path.

It should be noted that the determination on whether or not the curvature increases or decreases made in Step 34 or 38 may be, for example, a determination on whether or not a difference in the curvature of the travel path at two points separated by a predetermined reference distance along the travel path is equal to or more than a positive reference value or equal to or less than a negative reference value. Moreover, the degree of gently changing the curvature $\rho c$ of the travel path for control may be constant, or set to be variable so as to increase as the magnitude of the above-mentioned difference in the curvature of the travel path increases.

In Step 42, based on an elapsed time from a time point when the curvature $\rho c$ of the travel path for control is set in Step 36 or 40 and the vehicle speed V, a travel distance Lv of the vehicle from that time point is calculated. Then, the curvature $\rho c$ of the travel path for control is calculated based on the travel distance Lv from the map illustrated in FIG. 24 or 25, the curvature $\rho c$ of the travel path is set to the curvature $\rho$ of the travel path after the correction, and then the control proceeds to Step 44.

In Step 44, the width W of the travel path at a position where the vehicle is currently traveling is estimated based on the information on the travel path identified as in Step 20 of the first embodiment and the vehicle speed V, and then the control proceeds to Step 50.

As appreciated from the description given before, in the third embodiment, the steps other than Step 30 are carried out similarly to the case of the first embodiment. Thus, the third embodiment can provide the same actions and effects as those of the first embodiment. In other words, under the state in which the vehicle travels on a narrow path, the position of the vehicle in the lateral direction with respect to the travel path can be effectively controlled while the generation of the yaw angle is suppressed, and the correction steering required to correct the direction of the vehicle with respect to the travel path can be decreased.

Figure 7:
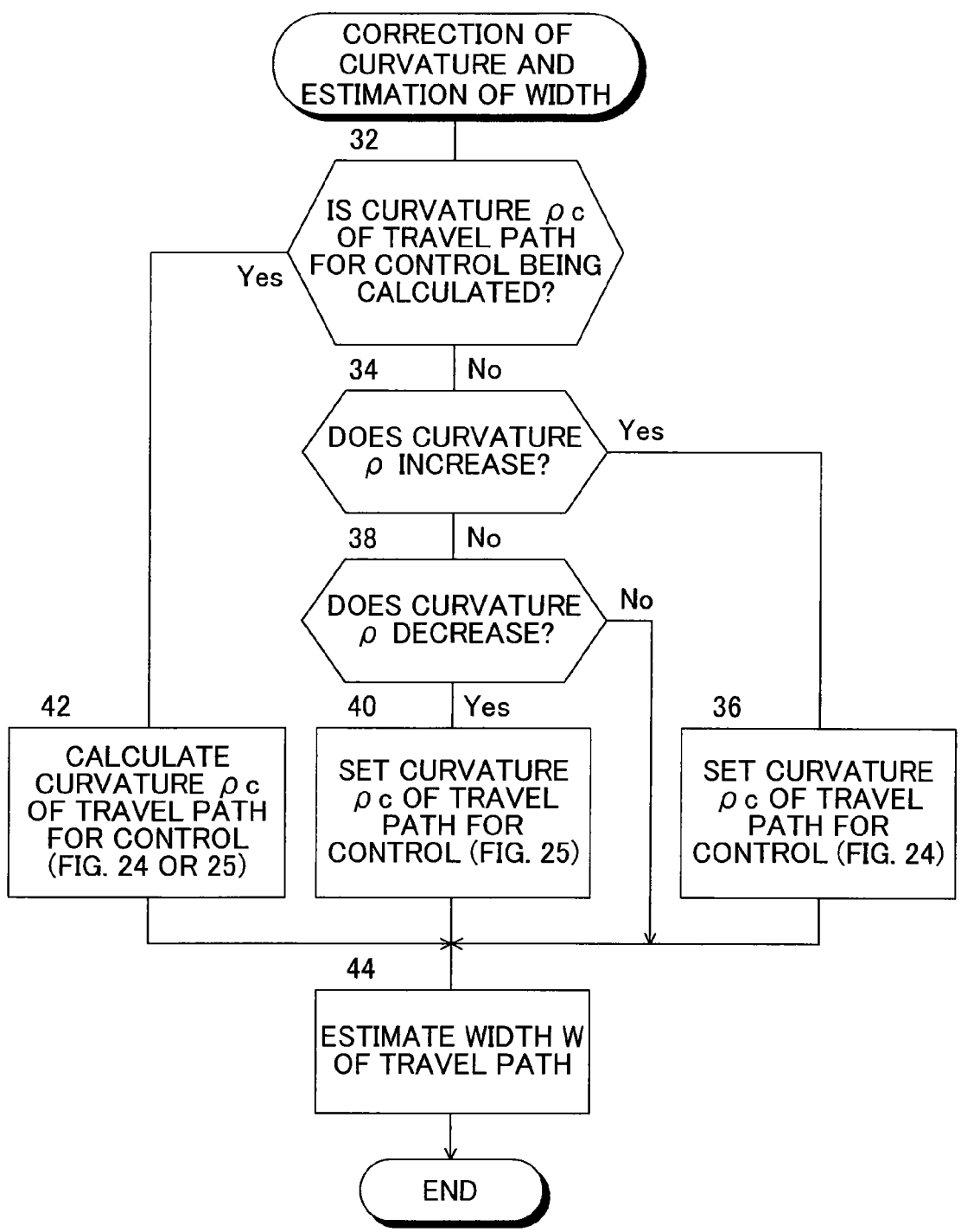
FIG. 7 is a flowchart illustrating a routine of correcting a curvature of the travel path and estimating the width thereof in Step 30 of FIG. 6.

Particularly, according to the third embodiment, in Step 30, in accordance with the flowchart illustrated in FIG. 7, the curvature $\rho$ of the travel path is corrected, the width W of the travel path is estimated, and then steps starting from Step 50 are carried out.

(C1) When Curvature of Travel Path Increases

In this case, first in Step 32, the negative determination is made, and, in Step 34, the affirmative determination is made. Then, in Step 36, based on the curvatures $\rho a$ and $\rho b$ of the travel path respectively before and after the curvature of the travel path increases, as illustrated in FIG. 24, the curvature $\rho c$ of the travel path for control is set as a map so as to increase earlier and more gently than the curvature $\rho$ of the actual travel path. Then, in Step 32, an affirmative determination is made, and, in Step 42, the curvature $\rho c$ of the travel path for control is calculated based on the travel distance Lv from the time point when the curvature $\rho c$ of the travel path for control is set from the map illustrated in FIG. 24, and the curvature $\rho c$ is set to the curvature $\rho$ of the travel path after the correction. As a result, the magnitude determination for the curvature of the travel path for calculating the correction coefficients K* is carried out based on the curvature $\rho$ of the travel path after the correction.

Thus, when the curvature of the travel path increases, the correction coefficients K* can be changed earlier and more gently than the change corresponding to the curvature $\rho$ of the actual travel path. As a result, the ratio of the gain of the lateral acceleration to the gain of the yaw rate and the ratio of the derivative gain of the lateral acceleration to the derivative gain of the yaw rate can be changed earlier and more gently than in the case of the first embodiment.

Thus, when the curvature of the travel path increases, it is possible to decrease a sense of discomfort caused by a rapid change in the turn response of the vehicle due to the change of increase in the curvature of the travel path, and, moreover, the driver can get used to the operability of the vehicle suited to the travel on the travel path with a large curvature before the curvature of the travel path actually increases.

(C2) When Curvature of Travel Path Decreases

In this case, first in Steps 32 and 34, the negative determinations are made, and, in Step 38, the affirmative determination is made. Then, in Step 40, based on the curvatures ρ and ρb of the travel path respectively before and after the curvature decreases, as illustrated in FIG. 25, the curvature ρc of the travel path for control is set as a map so as to decrease more gently than the curvature ρ of the actual travel path. Then, in Step 32, an affirmative determination is made, and, in Step 42, the curvature ρc of the travel path for control is calculated based on the travel distance Lv from the time point when the curvature ρc of the travel path for control is set from the map illustrated in FIG. 25, and the curvature ρc is set to the curvature ρ of the travel path after the correction. As a result, the correction coefficients K* are calculated based on the curvature ρ of the travel path after the correction.

Thus, when the curvature of the travel path decreases, the correction coefficients K* can be changed more gently than the change corresponding to the curvature ρ of the actual travel path. As a result, the ratio of the gain of the lateral acceleration to the gain of the yaw rate and the ratio of the derivative gain of the lateral acceleration to the derivative gain of the yaw rate can be changed more gently than in the case of the first embodiment.

Thus, when the curvature of the travel path decreases, it is possible to decrease the sense of discomfort caused by the rapid change in the turn response of the vehicle due to the change of decrease in the curvature of the travel path. Moreover, the change in the correction coefficients K* is not started from a stage at which, for example, the vehicle is traveling on a travel path within a large curvature, and thus a decrease in the narrow path traveling performance of the vehicle caused by the early start of the change in the correction coefficients K* can be securely avoided.

(C3) When Curvature of Travel Path does not Change

In this case, the negative determinations are made in Steps 32, 34, and 38. Thus, the curvature ρc of the travel path for control is not calculated, and the curvature ρ of the travel path used for the magnitude determination for the curvature ρ of the travel path is thus not corrected. Therefore, the correction coefficients K* are calculated based on the width W of the travel path depending on a result of the magnitude determination of the curvature ρ of the travel path.

In this way, according to the third embodiment, the correction coefficients K* are calculated based on the width W of the travel path depending on the result of the magnitude determination for the curvature ρ of the travel path corrected depending on the necessity. Thus, the narrow path traveling performance of the vehicle under the state in which the curvature ρ of the travel path changes can be increased compared with the case of the first embodiment while such a fear that the driver feels the sense of discomfort caused by the change in the curvature ρ of the travel path is decreased.

[Fourth Embodiment]

Figure 8:
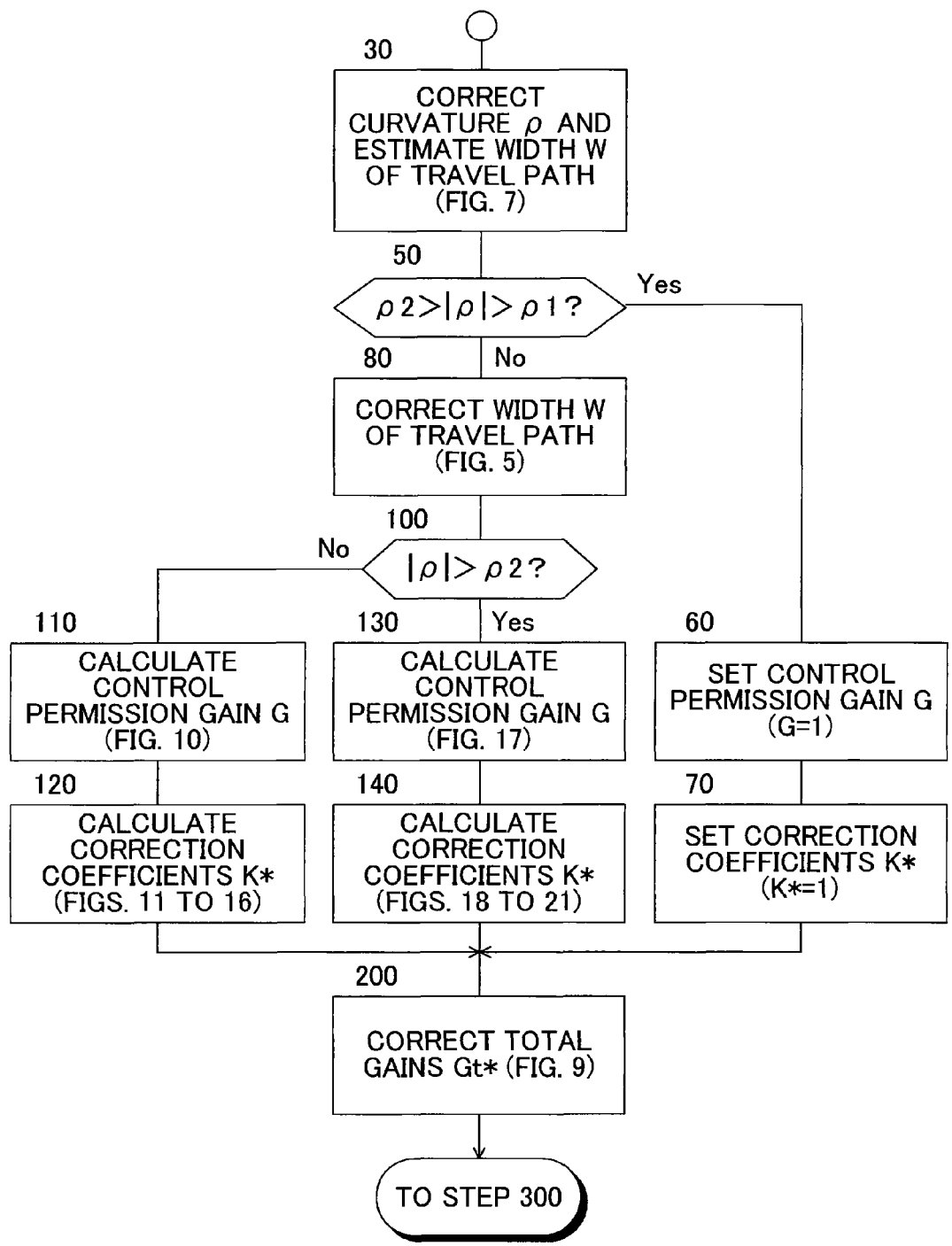
FIG. 8 is a flowchart illustrating a principal part of a steering control routine of a vehicle steering control device according to a fourth embodiment of the present invention applied to the four-wheel steering vehicle.

FIG. 8 is a flowchart illustrating a principal part of a control routine for steered angles of front and rear wheels of a vehicle steering control device according to a fourth embodiment of the present invention applied to the four-wheel steering vehicle.

As appreciated from a comparison between FIGS. 8 and 2, according to the fourth embodiment, Step 30 is carried out in place of Step 20 as in the third embodiment. Moreover, in Step 50, when the negative determination is made, Step 80 is carried out as in the second embodiment, and then the control proceeds to Step 100. Moreover, according to the fourth embodiment, when Step 70, 120, or 140 is completed, Step 200 is carried out prior to Step 300.

It should be noted that steps other than Steps 30, 80, and 200 are carried out in the same manner as in the first embodiment. Moreover, Step 30 is carried out in the same manner as in the third embodiment, and Step 80 is carried out in the same manner as in the second embodiment.

Figure 9:
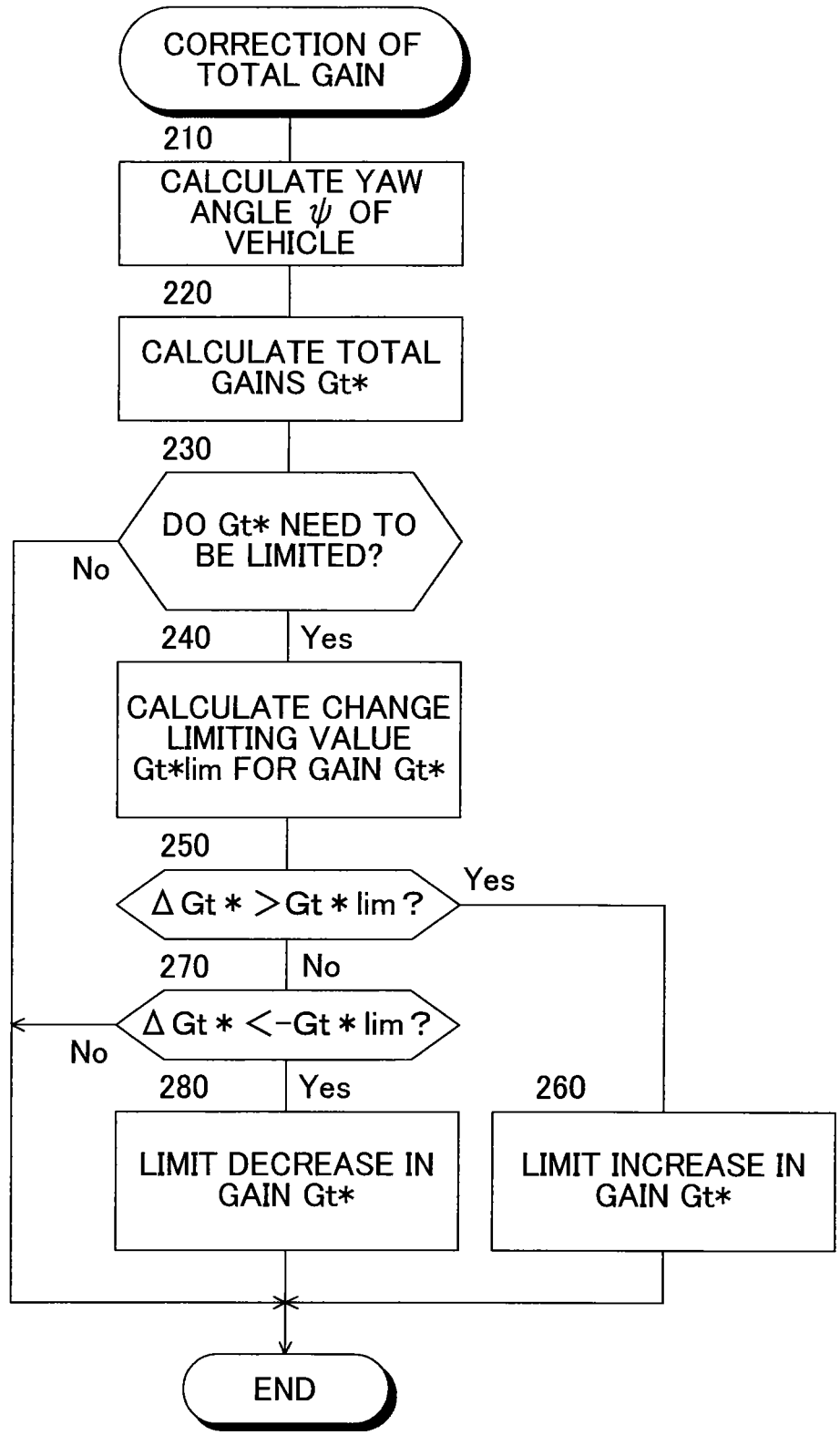
FIG. 9 is a flowchart illustrating a routine of correcting total gains in Step 200 of FIG. 8.

In Step 200, as described below, in accordance with the flowchart illustrated in FIG. 9, a correction of the total gains Gt* (suppression of changes in the total gains Gt*) used for the calculation of the target steered angles δft and δrt of the front and rear wheels is carried out.

First, in Step 210, based on the information on the identified travel path, a yaw angle ψ of the vehicle, namely, an angle of the longitudinal direction of the vehicle with respect to the longitudinal direction of the travel path is calculated. It should be noted that the yaw angle ψ of the vehicle only needs to be calculated in an arbitrary procedure.

In Step 220, the total gains Gt* for the yaw rate γ and the like of the vehicle with respect to the steering operation are calculated in accordance with Equations 5 to 10. It should be noted that total gains Gty and Gtg are respectively total gains of the yaw rate γ and the lateral acceleration Gy of the vehicle with respect to the steering operation. Moreover, total gains Gtyd and Gtgd are respectively total derivative gains of the yaw rate γ and the lateral acceleration Gy of the vehicle with respect to the steering speed. Further, total gains Gtym and Gtgm are respectively total attenuation gains of the yaw rate γ and the lateral acceleration Gy with respect to the steering speed.

$$Gty = \{Ky \cdot G + (1-G)\} Gay0 \tag{5}$$

$$Gtyd = \{Kyd \cdot G + (1-G)\} Gayd0 \tag{6}$$

$$Gtym = \{Kym \cdot G + (1-G)\} Gaym0 \tag{7}$$

$$Gtg = \{Kg \cdot G + (1-G)\} Gag0 \tag{8}$$

$$Gtgd = \{Kgd \cdot G + (1-G)\} Gagd0 \tag{9}$$

$$Gtgm = \{Kgm \cdot G + (1-G)\} Gagm0 \tag{10}$$

In Step 230, whether or not changes in the total gains Gt* need to be limited is determined. Then, when a negative determination is made, the control proceeds to Step 300, and when an affirmative determination is made, the control proceeds to Step 240. It should be noted that when a state in which the absolute value of the yaw angle ψ of the vehicle is larger than the reference value ψc (positive constant) continues for a reference period or more, such a determination that the changes in the total gains Gt* need to be limited may be made. Moreover, the respective steps starting from Step 240 are carried out for each of the total gains.

In Step 240, a change limiting value Gt*lim (positive value) for the total gain Gt* is calculated. In this case, the change limiting value Gt*lim is calculated depending on the absolute value of the yaw angle ψ so as to decrease as the absolute value of the yaw angle ψ increases. It should be noted that the change limiting value Gt*lim may be a constant value independently of the absolute value of the yaw angle ψ.

In Step 250, a difference ΔGt*(=Gt*−Gt*f) between the total gain Gt* and a previous value Gt*f thereof is calculated, and whether or not the difference ΔGt* between the total gains is larger than the change limiting value Gt*lim is determined. Then, when a negative determination is made, the control proceeds to Step 270, and when an affirmative determination is made, the control proceeds to Step 260.

In Step 260, an increase in the total gain Gt* is limited by correcting the total gain Gt* to a sum of the previous value Gt*f and the change limiting value Gt*lim, and then the control proceeds to Step 300.

In Step 270, whether or not the difference ΔGt* between the total gains is smaller than −Gt*lim is determined. Then, when a negative determination is made, the control proceeds to Step 300, and when an affirmative determination is made, the control proceeds to Step 280.

In Step 280, a decrease in the total gain Gt* is limited by correcting the total gain Gt* to a sum of the previous value Gt*f and −Gt*lim, and then the control proceeds to Step 300.

It should be noted that, in Step 300 according to the fourth embodiment, the target yaw rate γt and the target lateral acceleration Gyt of the vehicle are calculated by using the total gains Gt*. In other words, in Step 320 in Step 300, the target yaw rate γt of the vehicle is calculated in accordance with Equation 11, and, in Step 330, the target lateral acceleration Gyt of the vehicle is calculated in accordance with Equation 12.

$$\gamma t = Gty \cdot \theta + Gtyd \cdot \theta d + Gtym \cdot \theta d \quad (11)$$

$$Gyt = Gtg \cdot \theta + Gtgd \cdot \theta d + Gtgm \cdot \theta d \quad (12)$$

As appreciated from the description given before, in the fourth embodiment, the steps other than Steps 30, 80, and 200 are carried out in the same manner as in the first embodiment. Thus, the fourth embodiment can provide the same actions and effects as those of the first embodiment. In other words, under the state in which the vehicle travels on a narrow path, the position of the vehicle in the lateral direction with respect to the travel path can be effectively controlled while the generation of the yaw angle is suppressed, and the correction steering required to correct the direction of the vehicle with respect to the travel path can be decreased.

Moreover, Step 30 is carried out in the same manner as in the third embodiment, and Step 80 is carried out in the same manner as in the second embodiment. Thus, the fourth embodiment can provide the same actions and effects as those of the second and third embodiments. In other words, the narrow path traveling performance of the vehicle under the state in which the width W and the curvature ρ of the travel path change can be increased compared with the case of the first embodiment while such a fear that the driver feels the sense of discomfort caused by the changes in the width W and the curvature ρ of the travel path is decreased.

Moreover, according to the fourth embodiment, in Step 200, the total gains Gt* are corrected based on the yaw angle ψ of the vehicle so as to suppress the changes in the total gains Gt* used to calculate the target steered angles δft and δrt for the front and rear wheels.

(D1) When Absolute Value of Yaw Angle ψ of Vehicle is Larger than Reference Value ψc In this case, in Step 230, an affirmative determination is made, and, in Step 240, the change limiting value Gt*lim for the total gain Gt* is calculated depending on the absolute value of the yaw angle ψ so as to decrease as the absolute value of the yaw angle ψ increases.

Moreover, in Step 250, whether or not the difference ΔGt* between the total gain Gt* and the previous value Gt*f thereof is larger than the change limiting value Gt*lim is determined. Then, when the difference ΔGt* is larger than the change limiting value Gt*lim, in Step 260, the total gain Gt* is corrected to the sum of the previous value Gt*f and the change limiting value Gt*lim to limit the increase in the total gain Gt*.

Moreover, in Step 250, when the negative determination is made, in Step 270, whether or not the difference ΔGt* between the total gain Gt* and the previous value Gt*f thereof is smaller than the change limiting value −Gt*lim for the decreasing case is determined. Then, when the difference ΔGt* is smaller than the change limiting value −Gt*lim for the decreasing case, in Step 280, the total gain Gt* is corrected to a sum of the previous value Gt*f and −Gt*lim to limit the decrease in the total gain Gt*.

Thus, when the magnitude of the yaw angle ψ of the vehicle is large, and even when the width W or the curvature ρ of the travel path changes as the vehicle travels, great changes in the total gains Gt* caused by the changes in the correction coefficients K* are suppressed. Thus, compared with the cases of the first to third embodiments, under the state where the magnitude of the yaw angle of the vehicle is large, a rapid change in the turn response of the vehicle caused by the change in the width W or the curvature ρ of the travel path and the fear of the sense of discomfort felt by the driver due to the change can be decreased.

Figure 26:
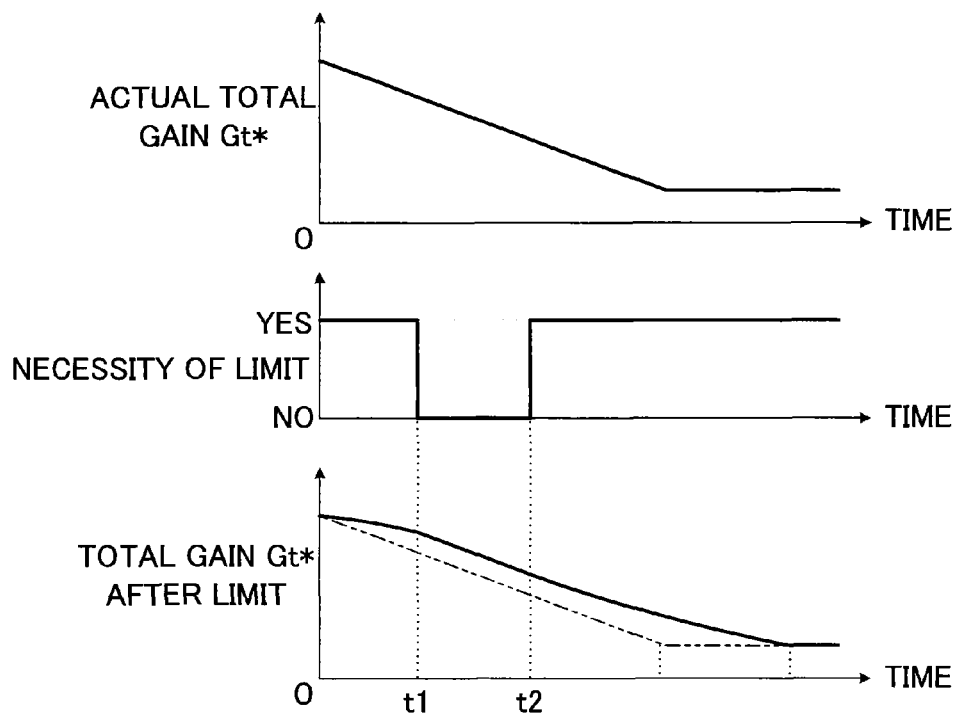
FIG. 26 is a diagram illustrating, in a case where a yaw angle ψ of the vehicle changes in a process of a gradual decrease in an actual total gain Gt*, and the decrease of the total gain Gt* is intermittently limited, a change in the total gain Gt* after the limit.

For example, FIG. 26 is a diagram illustrating a change in the total gain Gt*, in a case where the yaw angle ψ of the vehicle changes in a process of a gradual decrease in the actual total gain Gt*, and the decrease in the total gain Gt* is intermittently limited.

As illustrated in FIG. 26, the limit to the decrease in the total gain Gt* is not necessary from a time point t1 to a time point t2, but is necessary in the other periods. The total gain Gt* after the limit decreases at the same decrease rate as that of the actual total gain Gt* from the time point t1 to the time point t2, but decreases at a smaller decrease rate than that of the actual total gain Gt* in a period to the time point t1 and a period from the time point t2. Moreover, the decrease rate of the total gain Gt* after the limit from the time point t1 to the time point t2 changes depending on the absolute value of the yaw angle ψ.

It should be noted that even if the absolute value of the yaw angle ψ of the vehicle is larger than the reference value ψc, but the absolute value of the difference ΔGt* between the total gains Gt* is equal to or less than the change limiting value Gt*lim, the negative determinations are made in Steps 250 and 270. Thus, the change in the total gain Gt* is not limited.

(D2) When Absolute Value of Yaw Angle ψ of Vehicle is Smaller than Reference Value ψc In this case, a negative determination is made in Step 230, and Steps 240 to 280 are not carried out. Thus, the change in the total gain Gt* is not limited as in the case where the absolute value of the yaw angle ψ of the vehicle is larger than the reference value ψc, but the absolute value of the difference ΔGt* between the total gains Gt* is equal to or less than the change limiting value Gt*lim. Thus, the turn response of the vehicle under the state in which the magnitude of the yaw angle of the vehicle is small can be quickly changed in response to the change in the width W or the curvature ρ of the travel path.

Particularly, according to the fourth embodiment, in Step 240, the change limiting value Gt*lim for the total gain Gt* is calculated depending on the absolute value of the yaw angle ψ so as to decrease as the absolute value of the yaw angle ψ increases. Thus, the change rate of the total gain Gt* can be decreased as the magnitude of the yaw angle ψ increases, and as the necessity for the correction steering thus increases. Thus, the change of the total gain Gt* can be increased or decreased preferably depending on the necessity for the correction steering compared with, for example, a case where the change limiting value Gt*lim is constant independently of the magnitude of the yaw angle ψ.

Moreover, according to the second to fourth embodiments, the map for the width Wc of the travel path for control is set as the relationship with the distance in the travel direction of the vehicle. Thus, compared with a case where the map for the width Wc of the travel path for control is set as the relationship with the elapsed time, the width W of the travel path after correction and the respective correction coefficients K* based thereon can be easily calculated even for the case where the vehicle speed V changes.

Figure 27:
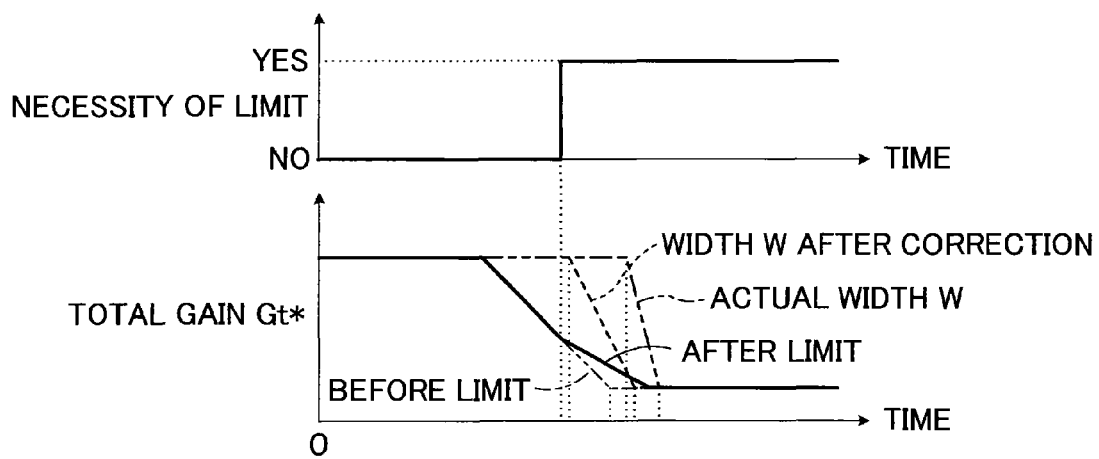
FIG. 27 is a diagram illustrating, in a case of a correction example where a change in the width W of the travel path is corrected under a state in which the width W decreases, an example of a change in the total gain Gt* when the limit to a decrease in the total gain Gt* becomes necessary in the process of the decrease.

It should be noted that the correction of the width W of the travel path in Step 80 according to the fourth embodiment may be carried out in the same way as in the first correction example. For example, as illustrated in FIG. 27, in the process of the decrease in the total gain Gt*, when the limit to the decrease in the total gain Gt* becomes necessary, a time point at which the decrease in the total gain Gt* is completed delays compared with the case where the decrease is not limited. However, when the width W of the travel path is corrected as in the first correction example, the width W of the travel path after the correction decreases earlier and more gently compared with the actual width. Thus, even under a state in which the decreases in the total gains Gt* need to be limited, the width of the travel path used for the calculation of the correction coefficients K*, namely, the width W of the travel path after the correction can be decreased before the actual decrease of the width W.

Moreover, in the fourth embodiment, the changes in all the total gains Gt* are limited through the execution of the respective steps starting from Step 240 for each of the total gains. However, the limit to the changes in the gains Gt* may be modified so that the limit is applied to a part of the gains Gty, Gtyd, Gtym, Gtg, Gtgd, and Gtgm calculated in Step 220.

A detailed description has been given of the specific embodiments of the present invention, but it is apparent to those skilled in the art that the present invention is not limited to the embodiments, and various embodiments are possible within a scope of the present invention.

For example, in each of the embodiments, the first and third turn response varying means are the turning angle varying device 14 for changing the relationship of the steered angle for the front wheels with respect to the steering operation amount. However, the first and third turn response varying means may be devices for changing the steering characteristic of the vehicle such as an active stabilizer device, an active suspension, and an active LSD, or an arbitrary combination thereof. Moreover, the first and third turn response varying means may be devices for providing a difference in the braking force or the driving force between the left and right wheels, further a combination with the above-mentioned other devices, or a combination of the turning angle varying device 14 and the above-mentioned other devices.

Moreover, in each of the embodiments, the second and fourth turn response varying means are the rear wheel steering device 42 for changing the relationship of the steered angle for the rear wheels with respect to the steered angle of the front wheels. However, the second and fourth turn response varying means may be a device for providing a difference in the braking force or the driving force between the rear left and right wheels independently of the front wheels, or a combination of the rear wheel steering device 42 and the device for providing the difference in the braking force or the driving force between the rear left and right wheels independently of the front wheels.

Moreover, in each of the embodiments, the travel path is identified by electronically processing the image information on the front view of the vehicle acquired by the CCD camera 68, and the curvature ρ and the width W of the travel path are estimated based on the information on the identified travel path and the vehicle speed V. However, the curvature and the width of the travel path may be estimated based on information provided from the navigation device, or may be estimated based on information on the travel path wirelessly transmitted from a base station.

Moreover, in each of the embodiments, the gains are controlled so that the gain Gay of the yaw rate γ decreases, and the gain Gag of the lateral acceleration Gy increases as the width W of the travel path decreases. However, such a modification that the gain Gay decreases as the width W of the travel path decreases without a change in the gain Gag may be made, or such a modification that the gain Gag increases as the width W of the travel path decreases without a change in the gain Gay may be made.

Moreover, in each of the embodiments, the gains are controlled so that the derivative gain Gayd of the yaw rate γ decreases, and the derivative gain Gagd of the lateral acceleration Gy increases as the width W of the travel path decreases. However, such a modification that the derivative gain Gayd decreases as the width W of the travel path decreases without a change in the derivative gain Gagd may be made, or such a modification that the derivative gain Gagd increases as the width W of the travel path decreases without a change in the derivative gain Gayd may be made.

Moreover, according to the second to fourth embodiments, the map of the width Wc of the travel path for control is set as the relationship with the distance in the travel direction of the vehicle. However, the map of the width Wc of the travel path for control may be set as a relationship with the elapsed time.

The invention claimed is:

1. A vehicle steering control device, comprising:
   first turn response varying means for changing a gain of a yaw rate of a vehicle with respect to a steering operation;
   second turn response varying means for changing a gain of a lateral acceleration of the vehicle with respect to the steering operation; and
   control means for controlling the first turn response varying means and the second turn response varying means,
   the control means being configured to control, under a state in which a magnitude of a curvature of a travel path is equal to or less than a reference value, at least one of the first turn response varying means and the second turn response varying means so that a ratio of the gain of the lateral acceleration to the gain of the yaw rate increases when a width of the travel path is small compared with when the width of the travel path is large.

2. The vehicle steering control device according to claim 1, wherein the control means controls, under a state in which the width of the travel path changes to decrease, at least one of the first turn response varying means and the second turn response varying means based on a width of a travel path for control, which is corrected so that the width changes earlier and more slowly than the width of the actual travel path.

3. The vehicle steering control device according to claim 1, wherein the control means controls, under a state in which the curvature of the travel path changes to increase, at least one of the first turn response varying means and the second turn response varying means based on a curvature of a travel path for control, which is corrected so that the curvature changes earlier and more slowly than the curvature of the actual travel path.

4. The vehicle steering control device according to claim 1, wherein the control means acquires information on a yaw angle of the vehicle, and controls at least one of the first turn response varying means and the second turn response varying means so that a change in at least one of the gain of the yaw rate and the gain of the lateral acceleration caused by a change in the width of the travel path becomes slower when a magnitude of the yaw angle of the vehicle is large compared with when the magnitude of the yaw angle of the vehicle is small.

5. The vehicle steering control device according to claim 1, wherein the first turn response varying means changes a relationship of a steered angle of a front wheel with respect to a steering operation amount.

6. The vehicle steering control device according to claim 1, wherein the first turn response varying means changes a steering characteristic of the vehicle.

7. The vehicle steering control device according to claim 1, wherein the second turn response varying means changes a relationship of a steered angle of a rear wheel with respect to a steered angle of a front wheel.

8. A vehicle steering control device, comprising:
   first turn response varying means for changing a derivative gain of a yaw rate of a vehicle with respect to a steering operation speed;
   second turn response varying means for changing a derivative gain of a lateral acceleration of the vehicle with respect to the steering operation speed; and
   control means for controlling the first turn response varying means and the second turn response varying means,
   the control means being configured to control, under a state in which a magnitude of a curvature of a travel path is equal to or more than a reference value, at least one of the first turn response varying means and the second turn response varying means so that a ratio of the derivative gain of the lateral acceleration to the derivative gain of the yaw rate increases when a width of the travel path is small compared with when the width of the travel path is large.

9. The vehicle steering control device according to claim 8, wherein the control means controls, under a state in which the width of the travel path changes to decrease, at least one of the first turn response varying means and the second turn response varying means based on a width of a travel path for control, which is corrected so that the width changes earlier and more slowly than the width of the actual travel path.

10. The vehicle steering control device according to claim 8, wherein the control means controls, under a state in which the curvature of the travel path changes to increase, at least one of the first turn response varying means and the second turn response varying means based on a curvature of a travel path for control, which is corrected so that the curvature changes earlier and more slowly than the curvature of the actual travel path.

11. The vehicle steering control device according to claim 8, wherein the control means acquires information on a yaw angle of the vehicle, and controls at least one of the first turn response varying means and the second turn response varying means so that a change in at least one of the derivative gain of the yaw rate and the derivative gain of the lateral acceleration caused by a change in the width of the travel path becomes slower when a magnitude of the yaw angle of the vehicle is large compared with when the magnitude of the yaw angle of the vehicle is small.

12. The vehicle steering control device according to claim 8, wherein the first turn response varying means changes a relationship of a steered angle of a front wheel with respect to a steering operation amount.

13. The vehicle steering control device according to claim 8, wherein the first turn response varying means changes a steering characteristic of the vehicle.

14. The vehicle steering control device according to claim 8, wherein the second turn response varying means changes a relationship of a steered angle of a rear wheel with respect to a steered angle of a front wheel.

* * * * *